United States Patent
Sugita et al.

(10) Patent No.: US 7,111,161 B2
(45) Date of Patent: Sep. 19, 2006

(54) COMMON STORAGE SYSTEM SHARED BY ONE OR MORE COMPUTERS AND INFORMATION PROCESSING SYSTEM HAVING THE SAME

(75) Inventors: Yumiko Sugita, Sagamihara (JP); Teiji Karasaki, Isehara (JP); Shinji Kimura, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 511 days.

(21) Appl. No.: 10/425,832

(22) Filed: Apr. 30, 2003

(65) Prior Publication Data
US 2004/0153640 A1  Aug. 5, 2004

(30) Foreign Application Priority Data
Feb. 3, 2003  (JP)  ............................. 2003-026368
Mar. 26, 2003  (JP)  ............................. 2003-084082

(51) Int. Cl.
G06F 15/177 (2006.01)
(52) U.S. Cl. ............................................. 713/2; 713/1
(58) Field of Classification Search .................... 713/1, 713/2, 100
See application file for complete search history.

(56) References Cited

U.S. PATENT DOCUMENTS 6,021,438 A * 2/2000 Duvvoori et al. ........... 709/224
6,854,009 B1 * 2/2005 Hughes ....................... 709/220
2002/0087854 A1 * 7/2002 Haigh et al. .................... 713/1
2003/0126242 A1 * 7/2003 Chang ......................... 709/222
2003/0191623 A1 * 10/2003 Salmonsen .................... 703/24
2004/0255000 A1 * 12/2004 Simionescu et al. ......... 709/208

FOREIGN PATENT DOCUMENTS

JP  6-332716 A  12/1994
JP  2002-6975 A  1/2002

* cited by examiner

Primary Examiner—Dennis M. Butler
(74) Attorney, Agent, or Firm—Mattingly, Stanger, Malur & Brundidge, P.C.

(57) ABSTRACT

The present invention is to provide a remote boot technique for realizing a remote boot easily. A common storage system 100 comprises: when a demand for the remote boot is received from a terminal unit A 200A, means for sending a program for collecting hardware information and software information of the terminal unit, to the demanding terminal unit A 200A; when the hardware information and the software information are received from the demanding terminal unit A 200A, means for creating registry information by using those information; means for sending a program necessary for the boot processing to the demanding terminal unit A 200A according to the registry information; and means for managing a license of the program properly.

18 Claims, 25 Drawing Sheets

FIG.4

| MAC ADDRESS (1141) | TERMINAL UNIT NAME (1142) | HARDWARE INFORMATION (1143) |
|---|---|---|
| MAC-A | TERMINAL UNIT A | 933MH:P4-1:512MB |
| MAC-B | TERMINAL UNIT B | 733MH:P3-2:256MB |
| MAC-C | TERMINAL UNIT C | 933MH:P3-4:512MB |

(1140)

| 1151 | 1152 | 1153 | 1154 |
|---|---|---|---|
| USER ID | USER INFORMATION | SOFTWARE ENVIRONMENT INFORMATION | EXECUTION ENVIRONMENT IDENTIFIER INFORMATION |
| User-A | USER A:**** | OS-A:APSet-A | EXECUTION ENVIRONMENT IDENTIFIER A |
| User-B | USER B:**** | OS-B:APSet-B | EXECUTION ENVIRONMENT IDENTIFIER B |
| User-C | USER A:**** | OS-A:APSet-C | EXECUTION ENVIRONMENT IDENTIFIER C |

| 1161 SOFTWARE IDENTIFIER | 1162 SOFTWARE NAME | 1163 START ADDRESS | 1164 SOFTWARE SIZE | 1165 CONDITION |
|---|---|---|---|---|
| OS-A | OS NAME 1 | Addr-A | 1GB | NULL |
| OS-B | OS MANE 2 | Addr-B | 500KB | CPU 500MHz~ |
| AP-1 | APNAME 1 | Addr-C | 100KB | NULL |
| AP-2 | APNAME 2 | Addr-D | 320KB | NULL |

| USER ID 1151 | USER INFORMATION 1152 | SOFTWARE ENVIRONMENT INFORMATION 1153 | EXECUTION ENVIRONMENT IDENTIFIER INFORMATION 1154 |
|---|---|---|---|
| User-A | USER A : **** | OS-A:APSet-A | EXECUTION ENVIRONMENT IDENTIFIER A |
| User-B | USER B : **** | OS-B:APSet-B | EXECUTION ENVIRONMENT IDENTIFIER B |
| User-C | USER C : **** | OS-B:APSet-B | EXECUTION ENVIRONMENT IDENTIFIER B |
| User-B | USER B : **** | OS-C:APSet-C | EXECUTION ENVIRONMENT IDENTIFIER C |

| ITEM NUMBER | LICENSE KEY | USER ID | MAC ADDRESS |
|---|---|---|---|
| 1 | 1 AB23CD4 | userA | MAC-A |
| 2 | 2 BC34DE5 | userB | MAC-B |
| 3 | 3 CD45EF6 | userC | NULL |
| 4 | 4 DE56FG7 | NULL | NULL |
| 5 | 5 EF67GH8 | NULL | NULL |
| ⋮ | ⋮ | | |

FIG.22

| ORDER NUMBER 1261 | SOFTWARE IDENTIFIER 1262 | SALES COMPANY 1263 | PURCHASE NUMBER 1264 | PURCHASE SUM 1265 | ORDER DATE 1266 | SCHEDULED DATE OF SHIPPING 1267 | BRANCH OF PAYMENT 1268 |
|---|---|---|---|---|---|---|---|
| 0011 | OS-A | COMPANY A | 20 | 10 K | 2002/12/01 | 2003/01/10 | S101230 |
| 0012 | OS-B | COMPANY C | 2 | 150 K | 2002/12/14 | 2002/01/14 | U204230 |
| .. | | | | | | | |
| 0043 | AP-1 | COMPANY A | 30 | 8 K | 2003/01/10 | 2003/02/10 | S111230 |
| 0044 | AP-2 | COMPANY B | 23 | 12 K | 2003/01/10 | 2003/02/10 | U300230 |
| .. | | | | | | | |

1260

COMMON STORAGE SYSTEM SHARED BY ONE OR MORE COMPUTERS AND INFORMATION PROCESSING SYSTEM HAVING THE SAME

BACKGROUND OF THE INVENTION

The present invention relates to a common storage system shared by a plurality of terminal units and to an information processing system having the same and, particularly, to a common storage system for making a remote boot possible for those terminal units and to an information processing system having the same.

There is a mode, in which a plurality of terminal units shares a storage unit for storing an operating system (hereinafter referred to as "OS") and an application program, by a network connection. The iSCSI (Internet Small Computer Systems Interface) protocol is known as connection method. The SCSI protocol for accessing the storage unit is used as a communication protocol on the network such as the Ethernet.

In case the terminal unit is provided with a remote boot function, the OS and the application program can be loaded from the storage unit having a control function. By connecting the terminal unit having the remote boot function and the storage unit through the iSCSI protocol, it is possible to realize a terminal unit, which need not be provided with an auxiliary storage unit. This terminal unit is called the "diskless terminal unit" or "diskless system".

In case the kinds of the individual terminal units are different in the remote boot of the diskless terminal unit, OS programs for every kinds are prepared on the common storage unit. At remote boot execution, the terminal unit has to read out the OS program file matching the kind of the terminal unit. This method is exemplified by one using the MAC (Medium Access Control) address. The MAC address is assigned to the terminal unit, the common storage unit having the control function and a LAN board mounted on a server. In this method, more specifically, a plurality of OS program files placed over the common storage unit are matched with the kind of the terminal unit, the directory stored with the OS program file group for the kind of the terminal unit are discriminated, and the remote boot is done by using the OS program file group under the directory. This method is disclosed, for example, in Japanese Patent Application Laid-open No. H6-332716 and U.S. Pat. No. 240,955.

Like the general terminal unit, moreover, the terminal unit for executing the remote boot described above is allowed to use most OS software under a license contract. Here, the software means the OS and the application program. The license contract is coarsely classified into two kinds. One has a mode, in which the license contract is made by fixing the user so that the software is installed for use on an arbitrary terminal unit. In another method, a unit of software is purchased under a license by an enterprise. The enterprise is responsible for the users, the number of user licenses and of the terminal units. Especially in the latter case, the method for the user to use software without any consciousness and to provide the license is disclosed in Japanese Patent Application Laid-open No. 2002-006975, for example. If the stock of the license is examined and found exhausted in case the software is demanded by user, the method uses the software, as not installed yet, on the terminal unit and settles the payment automatically with little load on the manager by automating the newly purchasing procedure.

SUMMARY OF THE INVENTION

In the terminal unit described above, the user designates the OS and application program to be used, and the conditions for starting them so that the execution environment of the terminal unit is set. This execution environment may be different for each user, and the execution environment such as the OS and application program to be used may also be different for the working contents to be done, even for the same user.

In the remote boot method, when the execution environment of a terminal unit is created over another terminal unit, there is needed the registry information such as the information of the device to use, the OS, the application program and the user.

In the conventional remote boot method, the registry information cannot be collected when the remote boot is demanded. This makes it necessary to create the registry information manually in the management directory or the like of an auxiliary storage unit having a control function. In the case of many terminal units for creating the execution environment and in the high frequency case, therefore, there arises a problem that the working load on the system manager is heavy. Moreover, for the case of creating the execution environment of a terminal unit in another terminal unit, there can be the case, in which the terminal unit used by the user is not fixed so that different terminal units are used at every time, and the case, in which the configuration of the system of the terminal unit newly introduced is changed. In these cases, a similar problem described above arises at the time of creating the execution environment.

The license management can also be done by the conventional method in the conventional case, in which a terminal unit and an execution environment of the terminal unit such as the OS or the application program to be used in the terminal unit are fixed in advance. However, when one user remotely boots an execution environment every time from different terminal units, in the conventional method of the license management, the licenses has to be retain by the number of used terminal units. In other words, a plurality of licenses is needed although one user uses only one software at one time. As a result, unnecessary licenses are present, and their cost rises high.

To solve this problem, there is conceived a method, in which a license key is assigned to a user and inputted each remote boot time. However, when one user has a plurality of execution environments and owns a plurality of licenses, this method is not efficient because of a high license management load on the user. Another problem of the conventional license management method is that it is difficult to retain the money for purchasing the license in advance, although a procedure for purchasing the license is prepared when the stock is exhausted.

An object of the present invention is to provide a remote boot technique for realizing a remote boot easily by creating registry information automatically in response to a demand of the remote boot when the execution environment of a terminal unit is created in another terminal unit.

At the same time, another object of the present invention is to provide a remote boot technique for realizing a proper and optimum license management easily.

In order to achieve the above objects, the present invention provides: a common storage system comprises, when a demand for the remote boot is received from a terminal unit, means for sending a program for collecting the hardware information and the software information of the terminal unit, to the demanding terminal unit, when the hardware information and the software information are received from the demanding terminal unit, means for creating registry information according to those information, and means for sending a program necessary for the boot processing to the demanding terminal unit according to the registry information; and an information processing system having the common storage system.

BRIEF DESCRIPTION OF THE DRAWINGS

FIG. 4 is a schematic diagram showing the detail of a data structure of terminal unit information;

FIG. 7 is a schematic diagram showing one example of a data structure of software information;

FIG. 16 is a schematic diagram showing one example of a data structure of user information, according to the second embodiment of the invention;

FIG. 19 is a schematic diagram showing one example of a data structure of license distribution status information, according to the first embodiment of the invention;

FIG. 22 is a schematic diagram showing one example of a data structure of purchase management information, according to the first embodiment of the invention;

DETAILED DESCRIPTION OF THE PREFERRED EMBODIMENTS

A first embodiment of the present invention will be described with reference to the drawings.

Figure 1:
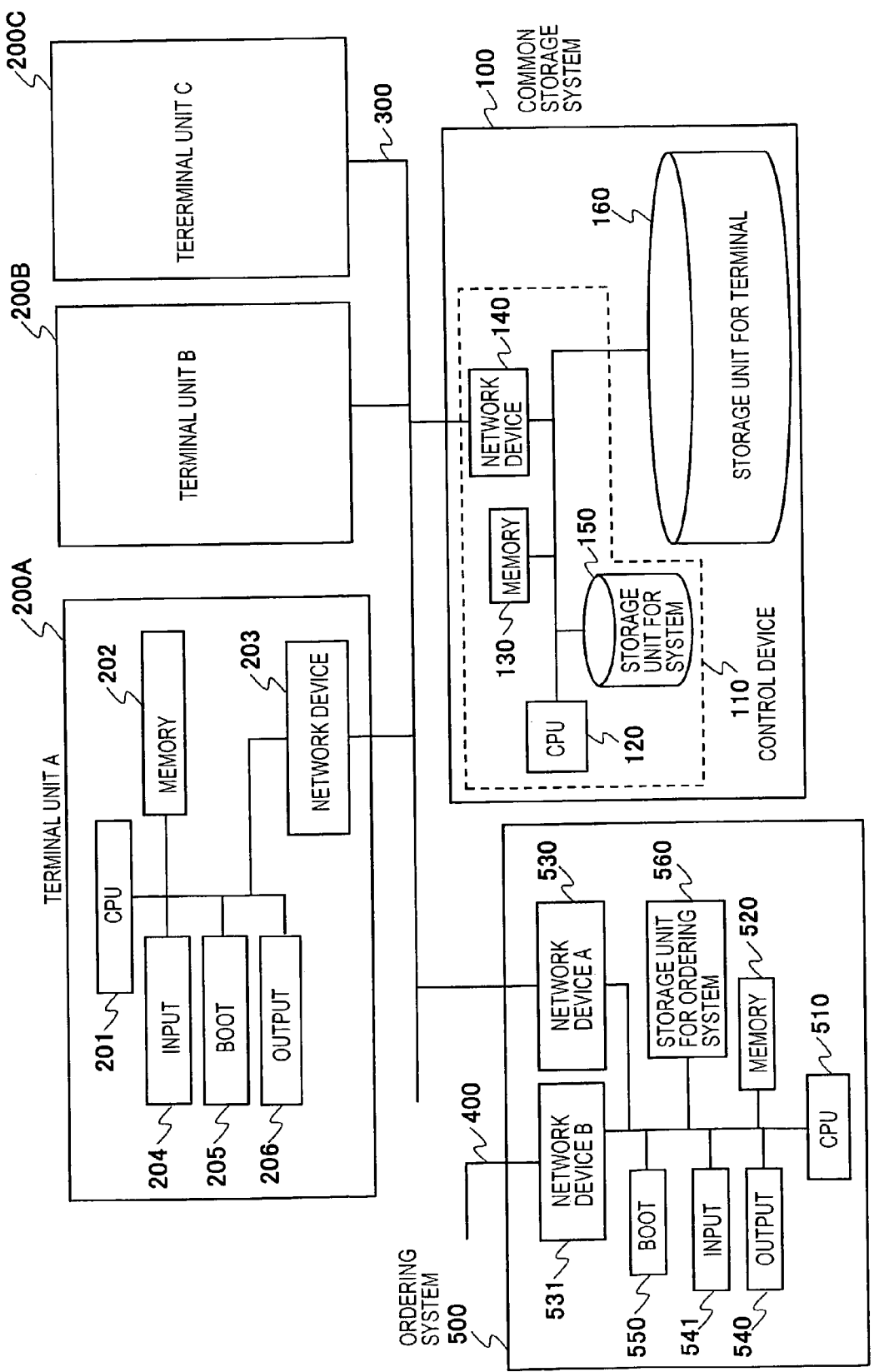
FIG. 1 is a block diagram showing a system configuration of an information processing system and an ordering system according to a first embodiment of the invention.

FIG. 1 is a block diagram showing a system configuration of an information processing system and an ordering system 500 according to the first embodiment of the present invention.

The information processing system includes one or more terminal units, and a storage system shared among the terminal units. This embodiment will be described by way of example on the case, in which a common storage system 100 is shared among three terminal units 200A, 200B and 200C. The present invention should not be limited to such configuration. For example, the present invention can also be applied to the case in which three or less or more terminal units are connected.

The common storage system 100 is an information processing device shared among said one or more terminal units, and includes a control device 110 for controlling the common storage system 100, and a terminal storage unit 160. Moreover, the common storage system is connected to the terminal unit 200A, the terminal unit 200B and the terminal unit 200C through a network so that it functions as a common storage device. Here, the terminal units are computers for executing various operations according to programs.

The control device 110 includes a CPU 120, a memory 130, a network device 140 and an own system storage unit 150. This own system storage unit 150 is stored with information and programs necessary for creating registry information to be used for a remote boot processing.

The terminal storage unit 160 functions as an individual assistant storage unit of each terminal unit under the control of the control device 110. This terminal storage unit 160 stores with the registry information in each terminal unit, one or more kinds of programs necessary for executing the information processing, data to be used for the executions, an information collecting program for collecting information necessary for the remote boot, and a boot loader program. As for one or more kinds of programs necessary for executing the information processing in the individual terminal units, for example, there are the OS and application programs corresponding to the individual terminal units.

Here, the terminal storage unit 160 can also cover when the terminal units are used partially or wholly by a plurality of users. In this case, the terminal storage unit 160 manages the storages of the OS, application programs and user data to match the users.

The own system storage unit 150 and the terminal storage unit 160 are units for storing data, programs and so on. These storage units 150 and 160 include randomly accessible media such as hard disks or semiconductor memories. In this embodiment, both of the storage units 150 and 160 are configured of randomly accessible hard disk devices having hard disks as the recording media. Here, the own system storage unit 150 and the terminal storage unit 160 may be integrated into one storage unit.

Each of the terminal unit A 200A, the terminal unit B 200B and the terminal unit C 200C includes a CPU 201, a memory 202, a network device 203, an input device 204, a boot control circuit 205 and an output device 206. The network device 203 and the network device 140 of the common storage system 100 can be connected through a LAN 300. Therefore, each of the terminal units 200A, 200B and 200C and the common storage system 100 can transfer information through the network. Here, the LAN 300 is used as the network in this embodiment but the embodiment is not limited to this.

Typically, as for the input device 204, there can be a keyboard or a mouse. Moreover, as for the output device 206, a display device is representative. Here, an output device 116 can contain a printer, if necessary.

The ordering system 500 accepts the purchase information from the common storage system 100 and orders from a software sales company through the network, when it purchases a license of the software to be used by the terminal unit 200. The ordering system 500 includes a CPU 510, a memory 520, a network device A 530, a network device B 531, an input device 540, an output device 541, a boot control circuit 550 and an ordering system storage unit 560. The network device A 530 and the network device 140 of the common storage system 100 can be connected through the LAN 300. Therefore, the ordering system 500 and the common storage system 100 can transfer the information through the network. Moreover, the network device B 531 can be connected to an external system through a network 400 such as the internet.

The ordering system 500 is generally provided at its ordering system storage unit 560 with the OS and the application program, and boots in itself. In another system, however, the ordering system storage unit 560 may not hold the OS and the application program but may demand the boot for the common storage system 100 like the terminal unit thereby to cause the remote boot processing. Here, the input device 541 and the output device 540 are similar to those of the terminal unit 200.

Figure 2:
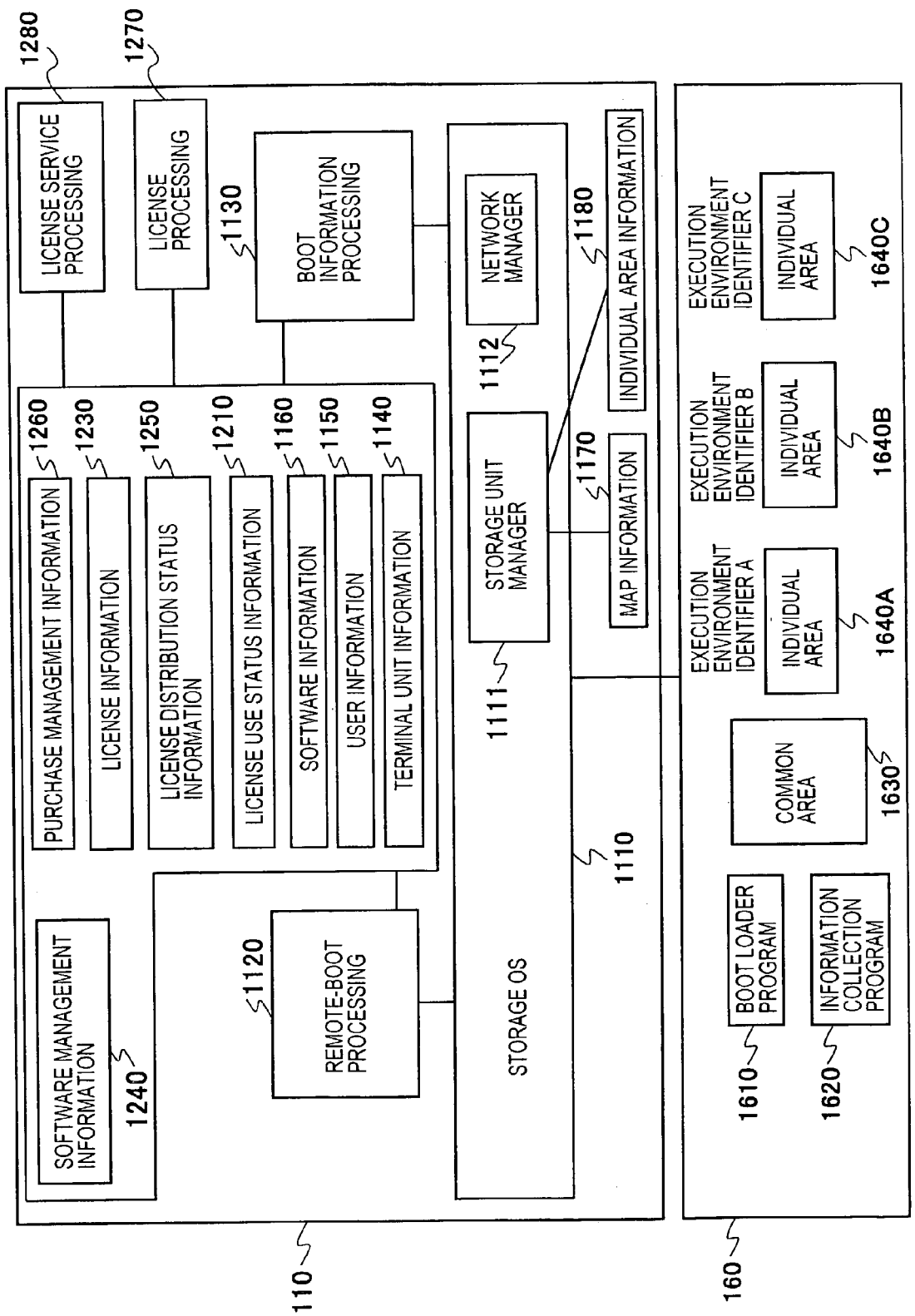
FIG. 2 is a block diagram showing a functional configuration of a common storage system.

FIG. 2 is a block diagram showing a functional configuration of the common storage system 100 in the first embodiment of the invention. First, the functions of the control device 110 for controlling the common storage system 100 will be described. Next, the functions of the terminal storage unit 160 will be described.

The own system storage unit 150 stores the various programs and data that will be described below. The control device 110 realizes the various operations in the common storage system by using those programs and data.

As the program to be stored in the own system storage unit 150, first, there is a storage OS 1110. This storage OS 1110 includes a storage unit manager (program) 1111 for controlling the terminal storage unit 160, and a network manager (program) 1112 for communicating with the individual terminal units through the LAN 300. As other remaining programs to be stored, there are various programs for functioning on the storage OS 1110. Specifically, there are a remote boot processing (program) 1120 for processing the remote boot demands from the individual terminal units, and boot information processing (program) 1130 for collecting the registry information of the individual terminal units to create the information areas that will be described later. In addition, there are a license processing (program) 1270 for managing the license of the software necessary for the remote boot processing, and a license service processing (program) 1280 for supplying and purchasing the license.

As for the data to be stored, there are the data for the booting information processing 1130 to manage the information for designating the execution environment. Namely, the data are terminal unit information 1140 for managing the individual terminal units to be connected with the common storage system 100, user information 1150 for managing the user to use the common storage unit, and software information 1160 for managing the OS and the application program to be used by the user. Moreover, as for the data to be referred by the storage unit manager 1111, there are map information 1170 for indicating a matching relation between the remote booted terminal unit and the later-described execution environment, and individual area information 1180 indicating the storage areas in which the pieces of information of the execution environment are individually stored. As for the information for managing the license of the software, there are license information 1230 for managing the information of the number of licenses purchased and the number of licenses actually used, license distribution status information 1250 for managing the distribution status of the license purchased, license use status information 1210 for managing the used status of the license purchased, software management information 1240 for managing the information necessary when the license of a software is purchased, and purchase management information 1260 for managing the order contents of the license purchased.

A plurality of storage areas is prepared in the terminal storage unit 160. Namely, there are an area for storing a boot loader program 1610 for remote booting the individual terminal units, and an information collection program 1620 for collecting information from the individual terminal units. Moreover, the terminal storage unit 160 is provided with portions acting as an auxiliary storage unit of the individual terminal units for storing the data. This data storing unit is divided into several areas. These areas are an individual area 1640 for storing the information indicating an execution environment necessary for remote booting the individual terminal units, and a common area 1630 for storing the information to be commonly used by the individual terminal units. The execution environment is determined for each terminal unit and for each user. The individual execution environments are identified by execution environment identifiers Therefore, the individual areas 1640 are provided for matching the execution environment identifiers. As for the individual areas created for the individual execution environment identifiers, for example, there are an individual area 1640A for an execution environment identifier A, an individual area 1640B for an execution environment identifier B, and an individual area 1640C for an execution environment identifier C. Thus, in this embodiment, the individual areas 1640 mean that the storage areas on the hard disk for storing the information of the execution environment necessary for the terminal unit. Therefore, the individual areas 1640 are configured as if they are individual terminal units or dedicated disk devices owned by the individual users. Alternatively, the individual areas 1640 could also be said the "virtual disk devices", which are provided at the individual terminal units. These individual areas will be described on their specific configurations (as referred to FIG. 17).

Figure 17:
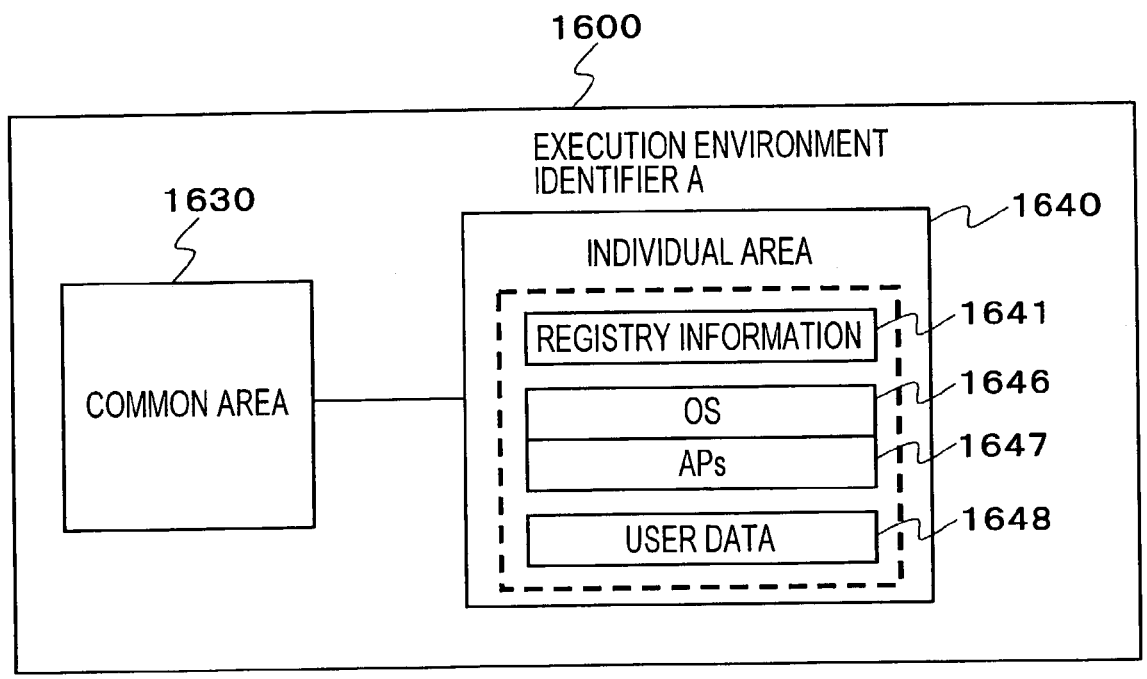
FIG. 17 is a block diagram showing a configuration of an individual area to be managed by using an execution environment identifier, according to the first embodiment of the invention.

FIG. 17 shows a configuration of the individual area to be managed by using an execution environment identifier. The individual area 1640 is an area storing with the information necessary for the terminal unit to remote boot. The information to be stored in the individual area 1640 contains registry information 1641, an OS 1646, an application program group 1647 and user data 1648.

Figure 14:
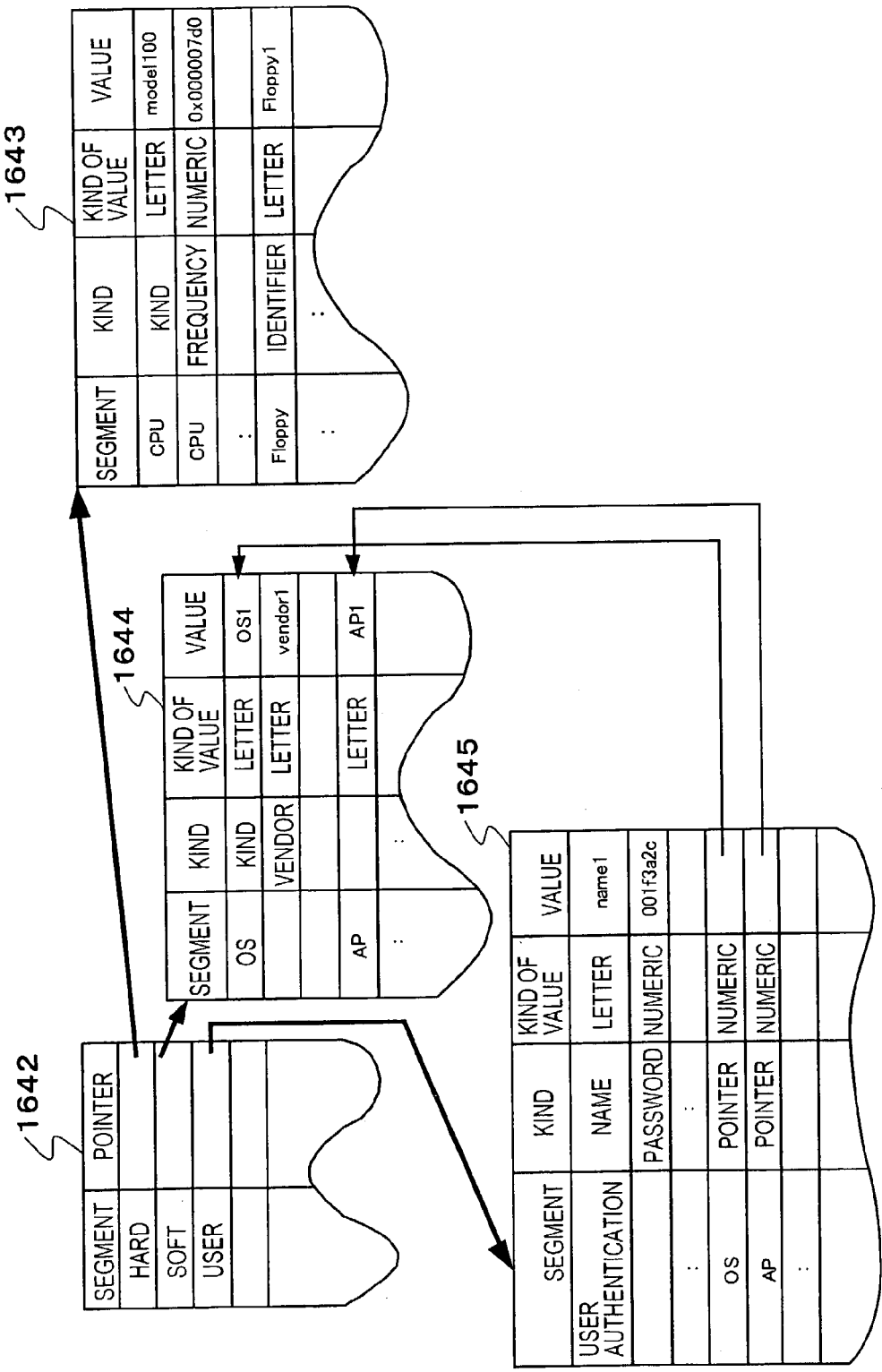
FIG. 14 is a schematic diagram showing one example of a data structure of registry information.

The registry information 1641 is the information for managing the system configuration of the terminal unit. As shown in FIG. 14, the registry information 1641 includes a registry management table 1442, a hardware information table 1643, a software information table 1644 and a user information table 1645. The registry management table 1642 positions the individual tables with pointers.

Here in the information storing type, the tables are used in this embodiment. However, the information storing type in the present invention should not be limited the table. In short, the information storage can take any type.

The hardware information table 1643 stores the information of the hardware which exists in the object terminal unit. Specifically, the information of the performance of the terminal unit such as the kind, frequency and configuration information of the processor, and the information of a device controller for controlling the actions of various devices such as a flexible disk device, a keyboard or a mouse are stored to match the various devices. Further, the information of the network is stored, such as the network port ID information used.

The software information table 1644 stores various kinds of program information, as installed on the object terminal unit, on the OS and the application program, such as a directory path name, a program name, a version or a vendor name, and information indicating the kind of a document to be created by the application program. Further, properties are stored, such as the image information or names of icons of folders and programs.

The user information table 1645 stores profiles of each user such as the user ID, the name, the password or the authorization, and the OS, the application and the keyboard arrangement information, as used by the user. This user information table 1645 is created by the number of users having remote booted the execution environment.

Here, not shown, the registry information 1641 can include information of the accounting. When the user is requested for the remote booting expenses according to the number of demands for the remote boot, for example, the information of the accounting has to be managed with the registry information 1641.

These registry information 1641 are stored in the own system storage unit 150 in such a format as can be edited in the boot information processing 1130 by the CPU 120. The boot information processing 1130 is for editing the registry information in accordance with the contents of the starting conditions at a remote boot demanding time. According to the registry information 1641 edited, the corresponding OS 1646, application program group 1647 and user data 1648 can be stored in the individual area 1640 of the terminal storage unit 160.

Here, the OS 1647 and the application program group 1648 can be managed in such a state that they are resident in the individual area 1640 managed for each execution environment identifier. Moreover, the OS and the application program group stored in advance in the common area 1630, may be copied from the common area 1630 at each time of the stage which the terminal unit remote boots, and may be stored in the individual area 1640.

Figure 3:
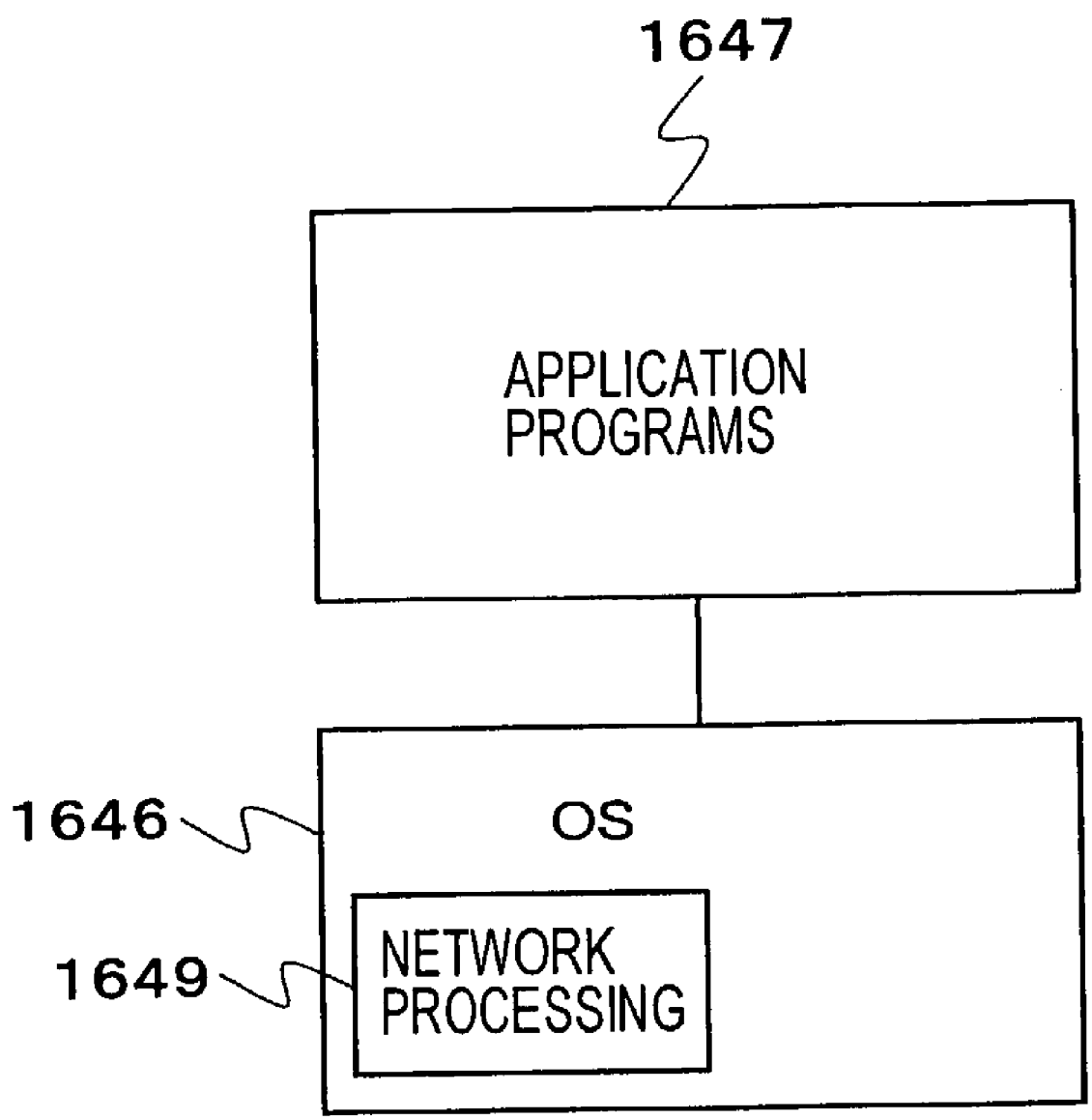
FIG. 3 is a block diagram showing a configuration of a software to act in a terminal unit.

FIG. 3 is a block diagram showing a configuration of the software of the terminal unit having remote booted the individual area 1640 of the execution environment identifier A. In the terminal unit, the application program group 1647 executes on the OS 1646 designated by the user. The OS 1646 includes the function of a network processing 1649 for communicating with the common storage system 100 through the LAN 300. The software such as the OS 1647, the application program group 1647 and so on and the user data, not shown, are loaded from the individual area 1640 of the common storage system 100 by the remote boot when each terminal unit is turned ON. By the remote boot function stored in the boot control circuit 205 (as referred to FIG. 1), the individual area 1640 of the common storage system 100 is accessed from the network device 203 through the LAN 300 to read the data in the memory 202.

Figure 23:
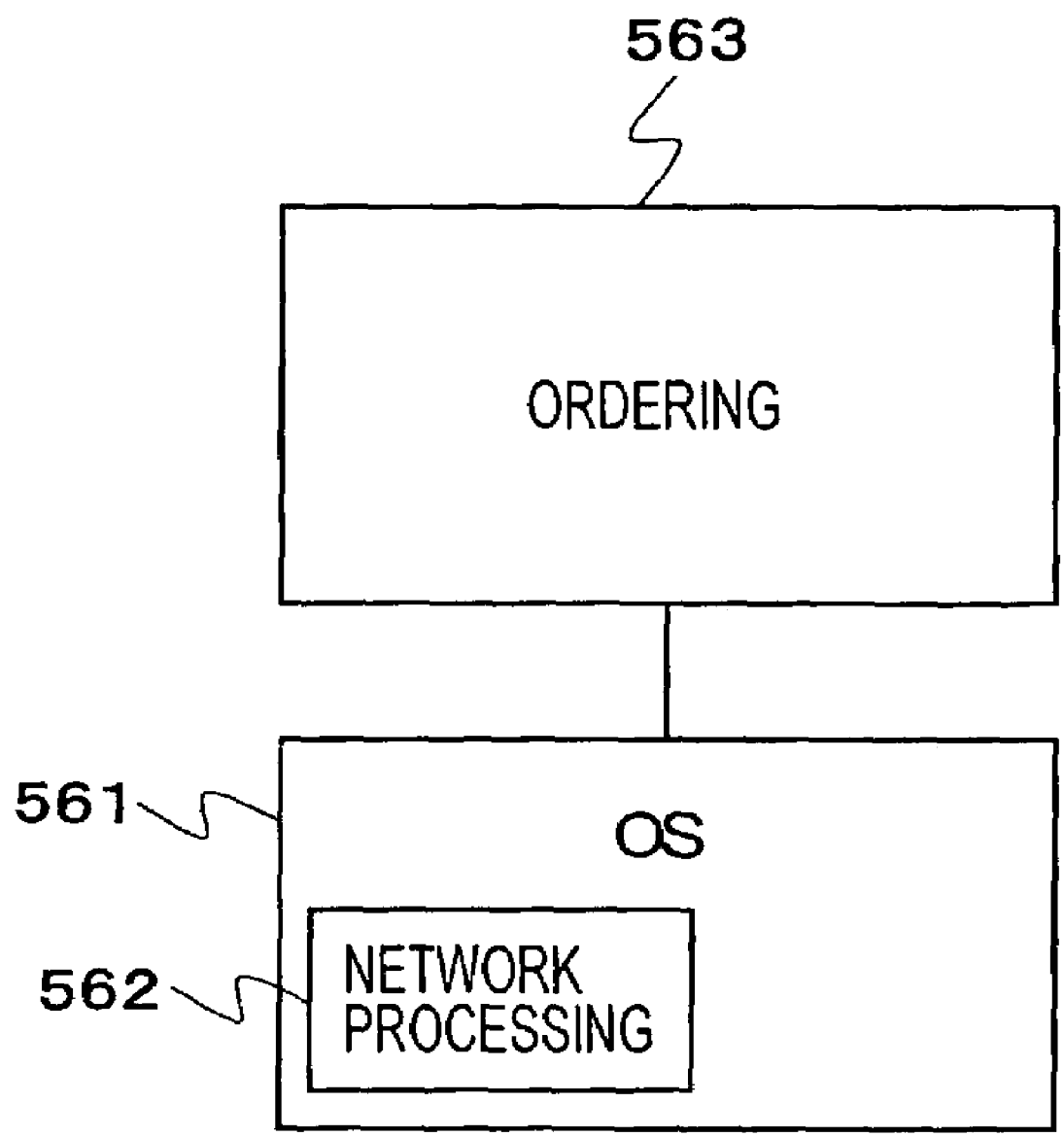
FIG. 23 is a block diagram showing a configuration of a software to act in an ordering system.

FIG. 23 shows a configuration of the software of the ordering system 500. In this ordering system 500, an OS 561 and an ordering program 563 for an ordering operation are stored in the ordering system storage unit 560 and the application program is executed on the OS 561. This OS 561 includes a function of a network processing 562 to communicate with the common storage system 100 through the LAN 300 and with the external system such as a software vending company through the network 400 such as the internet. These OS 561 and the ordering program 563 are read in the memory 520 and executed by the CPU 510 to realize the ordering operation.

FIG. 4 is a table structure diagram showing the detail of the terminal unit information 1140 schematically. The terminal unit information 1140 includes a MAC address 1141 inherent to each network device 203 of each terminal unit, each terminal unit name 1142 and hardware information 1143 determined from the configuration information of each terminal unit. The information to be recorded as the hardware information 1143 in this embodiment is the main information in the registry information 1641 such as the frequency, kind and number of the CPU 201, the size of the memory 202.

Figure 5:
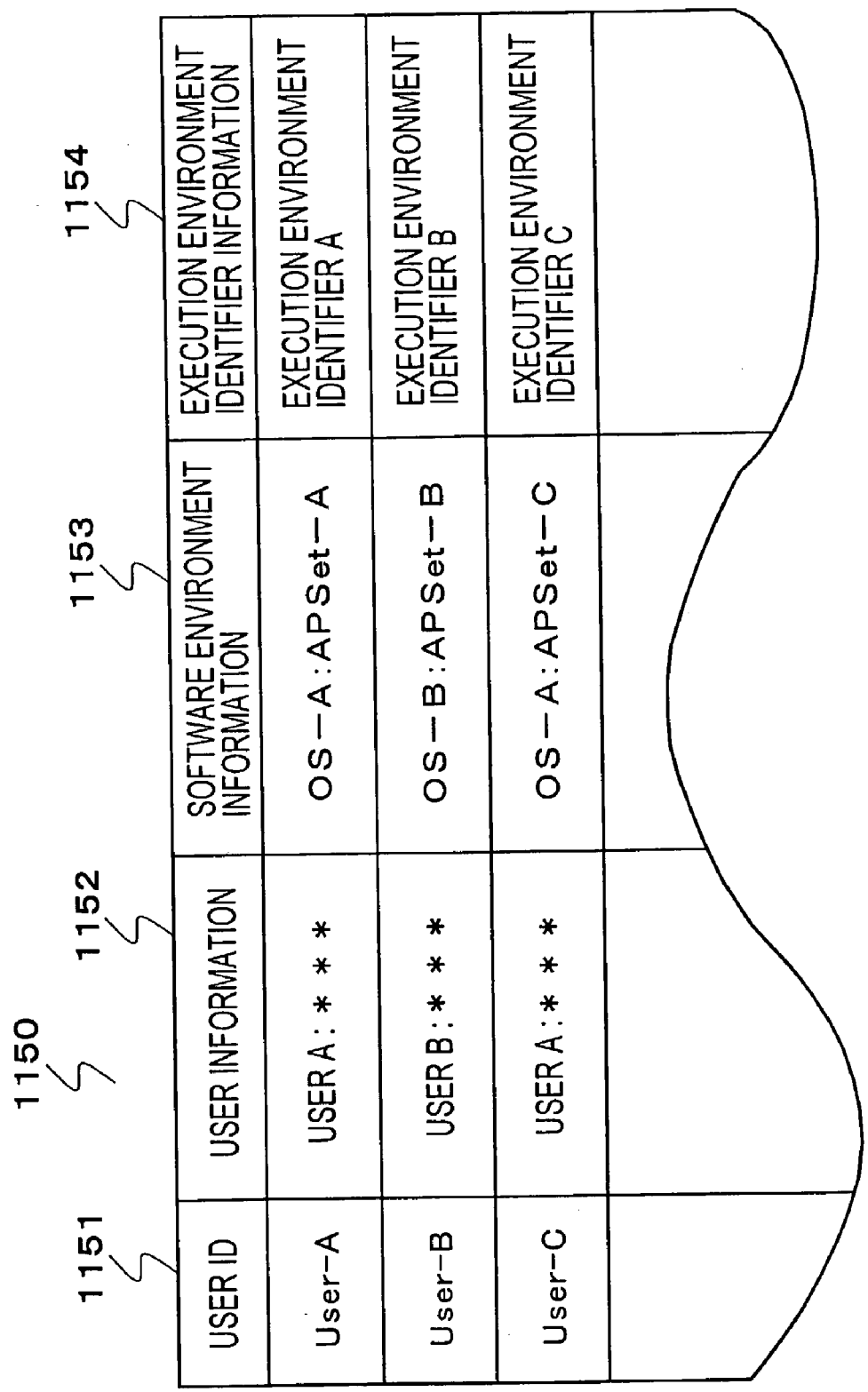
FIG. 5 is a schematic diagram showing a data structure of user information.

FIG. 5 shows the detail of the data structure of the user information 1150 schematically. The user information 1150 includes a user ID 1151, user information 1152, software environment information 1153 and execution environment identifier information 1154.

The user ID 1151 stores an identifier for managing the user. The user information 1152 stores information of the user such as the name and password of the user. The software environment information 1153 stores the environment of the software to be used by the user, such as the kind of the OS, the list name of the application program to be used, and their versions. The execution environment identifier information 1154 stores the execution environment identifier matching the aforementioned software environment information 1153.

This execution environment identifier is used to manage the individual area 1640 which stores the execution environment of each terminal unit. Referring to the individual area information 1180 of FIG. 9, the place of the individual area 1640 managed by each execution environment identifier stored in the terminal storage unit 160 can be reveal. In other words, the individual execution environment identifiers are correspond to the individual areas managed by the former.

Figure 6:
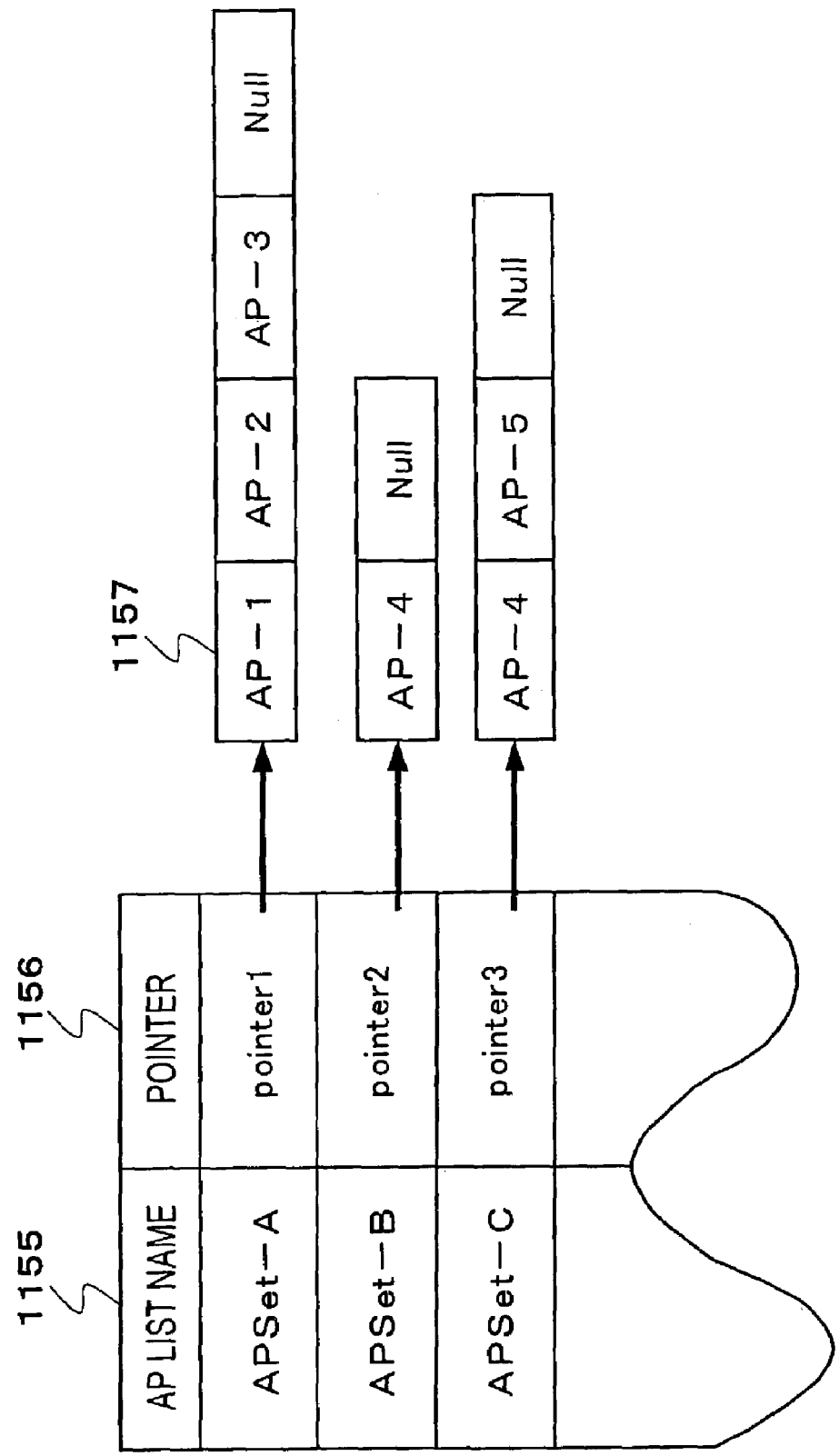
FIG. 6 is a schematic diagram showing one example of a data structure, as contained in software environment information, for managing the contents of list names of an application program group.

FIG. 6 schematically shows one example of a data structure, as contained in the software environment information 1153, for managing the contents of the list names of the application program group. In this embodiment, the data structure is a table structure. This table structure includes names 1155 of the application program list, and pointers 1156 of an information structure on the application program used. The pointers 1156 point out a chain list 1157 of the information structure. The end of the chain list 1157 is identified by a Null pointer.

FIG. 7 schematically shows the detail of the software information 1160 for managing the software of the OS and the application program to be used in each terminal unit. The example of FIG. 7 is a table structure. The software information 1160 includes a software identifier 1161, a software name 1162, a start address 1163, a software size 1164 and a condition 1165. This condition 1165 stores the conditions of the hardware and software at the time when the object software is to be operated. Specifically, the conditions (e.g., memory sizes or performances of the CPU), if any, on the hardware of the terminal unit necessary for the object software to execute are stored.

Figure 8:
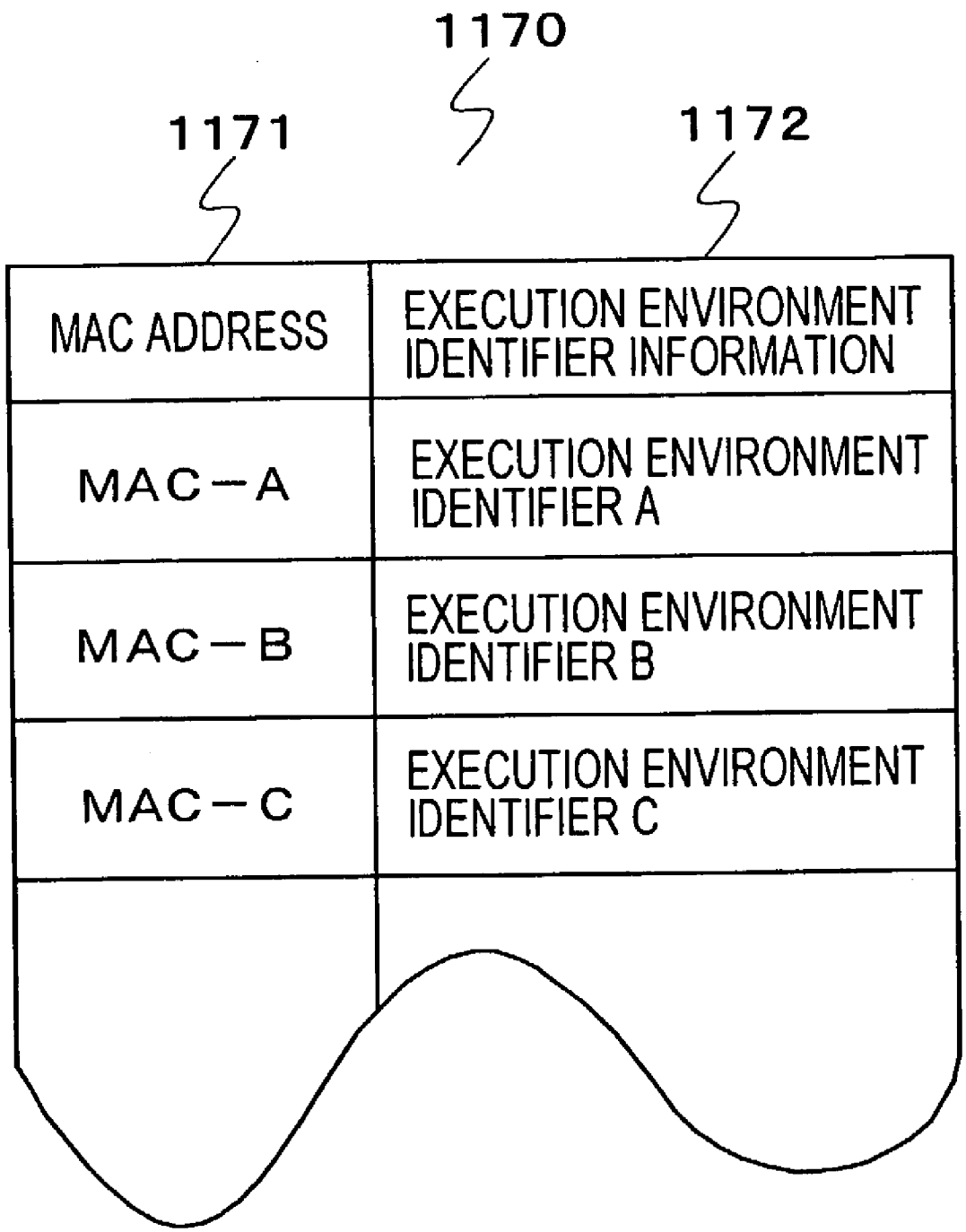
FIG. 8 is a schematic diagram showing one example of a data structure of map information.

FIG. 8 shows one example of the detail of the map information 1170 schematically. The example shown in FIG. 8 has a table structure. The map information 1170 is a table for corresponding the terminal units and their execution environments to each other. The map information 1170 includes a MAC address 1171 or the identification information of the terminal unit, and execution environment identifier information 1172 for identifying the execution environment.

Figure 9:
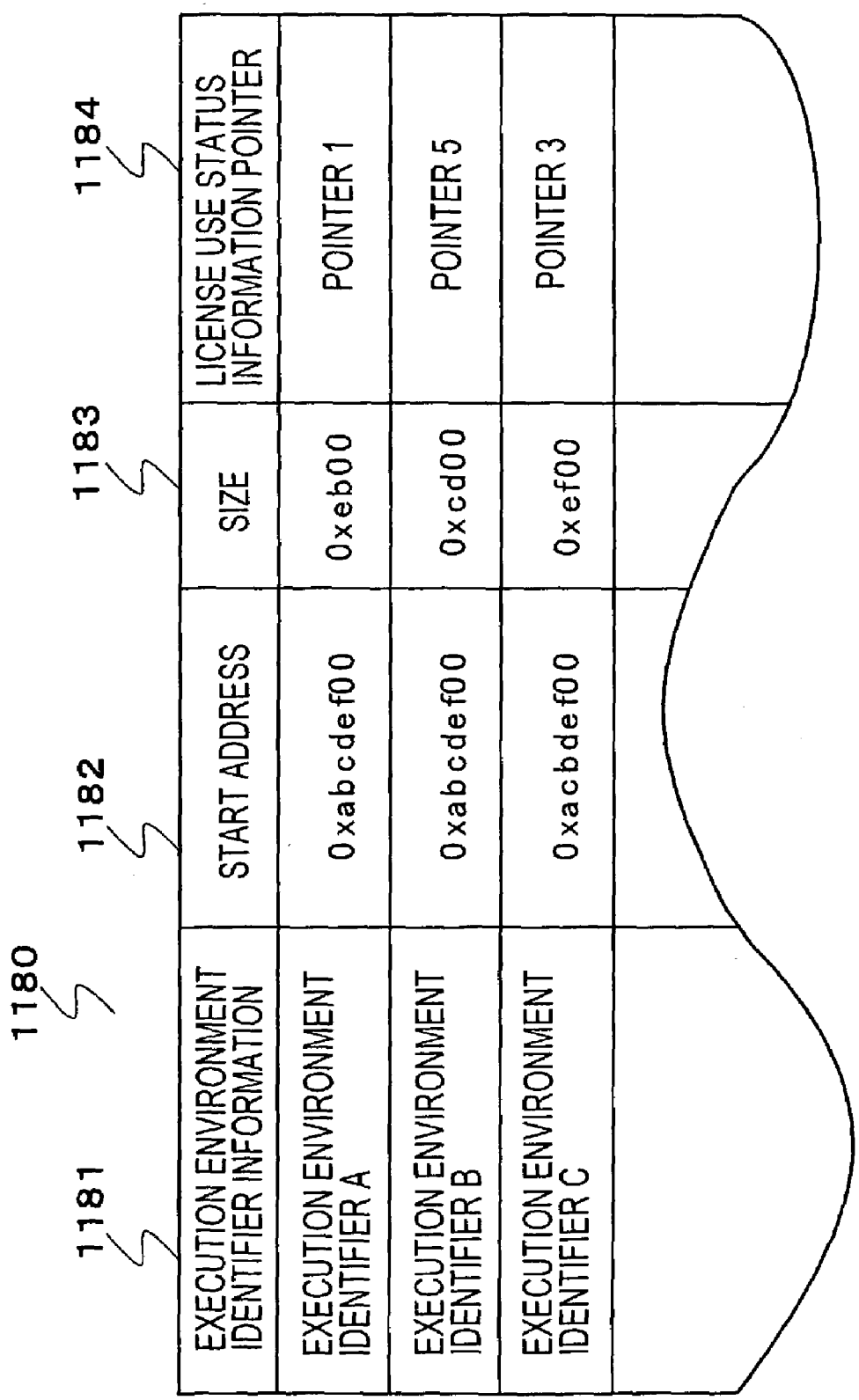
FIG. 9 is a schematic diagram showing one example of a data structure of individual area information.

FIG. 9 shows one example of the detail of the individual area information 1180 schematically. The example shown in FIG. 9 has a table structure. The individual area information 1180 is a table indicating the execution environment identifiers and the information of the individual areas managed by the former. This table includes execution environment identifier information 1181 stored with the execution environment identifiers, start addresses 1182 of the terminal storage unit 160 stored with the individual areas of the execution environment identifiers, sizes 1183 of the individual areas, and pointer information 1184 for the later-described license use status information table 1210 (as referred to FIG. 20).

Figure 18:
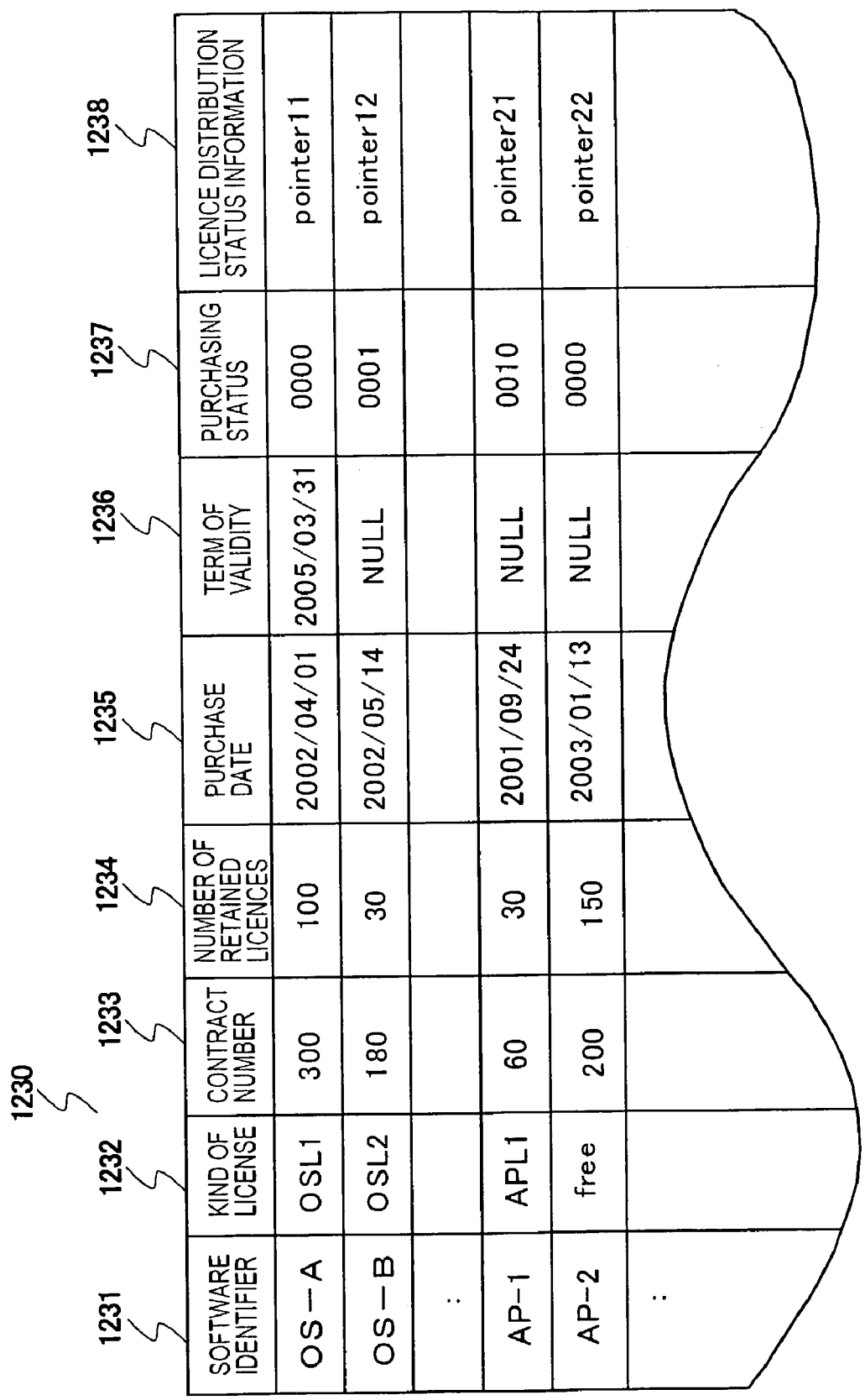
FIG. 18 is a schematic diagram showing one example of a data structure of license information, according to the first embodiment of the invention.

FIG. 18 schematically shows one example of the detail of the license information 1230 of the software used by the terminal unit. The example shown in FIG. 18 has a table structure. The license information 1230 includes a software identifier 1231 for identifying the individual software, license kind information 1232, contract number information 1233 of the licenses contracted (or purchased), use number information 1234 of the number of licenses distributed at present to the users, date information 1235 of the date when the license of the software was purchased, validity term information 1236 of the license, information 1237 on the license purchasing status, and pointer information 1238 for the license distribution status information 1250 described later (as referred to FIG. 19).

The license kind information 1232 indicates the kind of the license on whether the license belongs to a specific company, a general license or not. The validity term information 1236 of the license is registered by year, month and date but by NULL if the valid term expires. In the purchase status information 1237, there are registered the stepwise statuss of purchase, such as no information, awaiting the purchase decision or purchasing. These purchase statuss are composed of 4 bits, for example, and it can be conceived to set "0000" for no information, "0001" for awaiting the purchase decision, and "0010" for the purchase status.

FIG. 19 schematically shows one example of the detail of the license distribution status information 1250 for managing the distribution status of the license contracted (or purchased). The example shown in FIG. 19 has a table structure. The license distribution status information 1250 is created for each software and includes an item number 1251, a license key 1252, a user ID 1253 of the actual user, and a MAC address 1254 or an identifier of the terminal unit used.

To the item number 1251, for example, there are assigned the numerical values from 1 to the contract number of licenses. The license key 1252 is a key for releasing such as the software using limit, the function limit, and the number of license keys assigned is equal to that of the license contracts. The license key 1252 is managed by encrypting it so that it may be unable to be referred by those other than the system manager. Each license key is set with either the user ID 1253 of the user of the license key or the MAC address 1254, but the license key unused is set with NULL.

Figure 20:
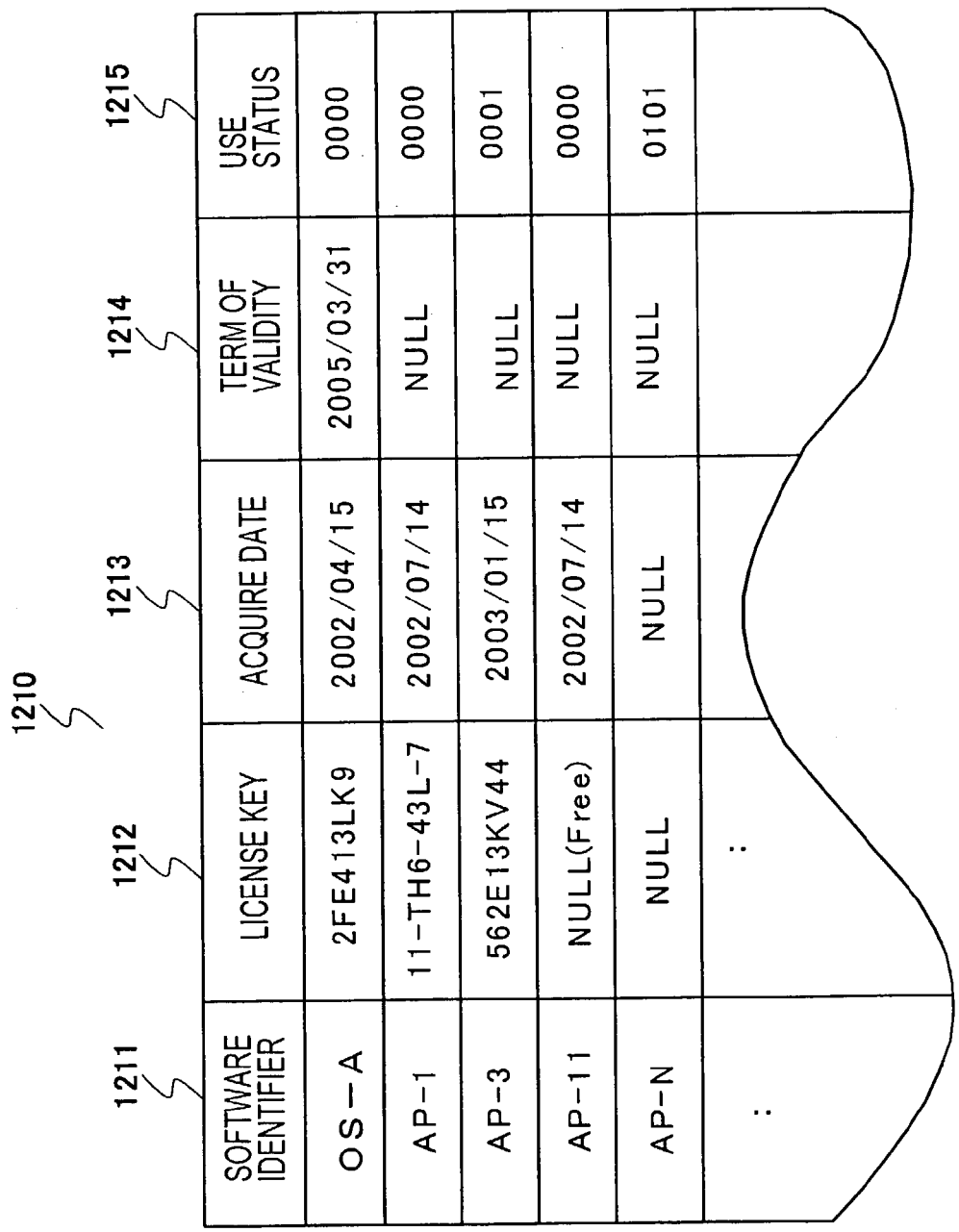
FIG. 20 is a schematic diagram showing one example of a data structure of license use status information, according to the first embodiment of the invention.

FIG. 20 shows one example of the detail of the license use status information 1210 schematically. The example shown in FIG. 20 has a table structure. The license use status information 1210 includes a software identifier 1211 for identifying the software, a license key 1212 assigned to the user or the terminal unit, acquire data information 1213 when the license is assigned, valid term information 1214 of the license, and information indicating the use status 1215.

In the license validity term information 1214, the same year, month and date as the validity term 1236 of the license information 1230 (as referred to FIG. 18) are registered. In case the term expires, the NULL is registered. Moreover, the use status information 1215 is composed of 4 bits, for example, and it can be set with the use status information containing pieces of information of the purchase: "0000" for the contracted and used status; "0001" for the contracted but unused status; "0010" for the contracted but use-held status; "0101" for the purchase awaiting status; and "1001" for the purchase status.

Figure 21:
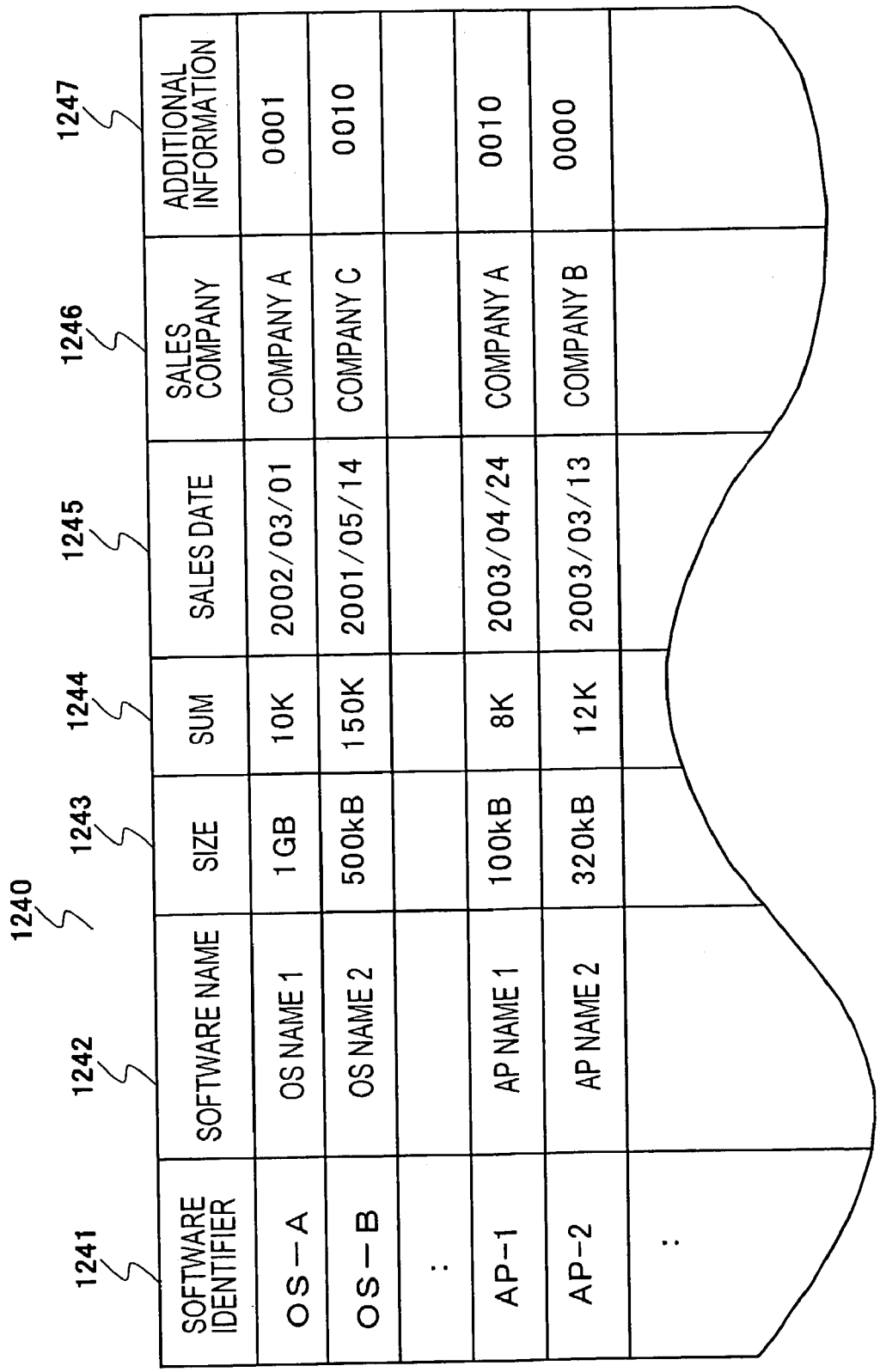
FIG. 21 is a schematic diagram showing one example of a data structure of software management information, according to the first embodiment of the invention.

FIG. 21 schematically shows one example of the detail of the software management information 1240 for managing the information of the software necessary for purchasing the software. In the software management information 1240, the software purchased at present is registered. The sales information of the software is also registered, such as a new software or a software of a version-up edition of the purchased software by collecting information from the internet, intranet, or the like. The software management information 1240 includes a software identifier 1241, a software name 1242, software storage size information 1243, purchasing sum information 1244 on the software or license, sales date information 1245 on the date of sales or future sales, sales company information 1246, and additional information 1247 on the purchase of a set sales or an update edition of the present license. This additional information 1247 is composed of 4 bits, for example, and it can be registered at bit units by classifying it with different attributes such as "0001" for the update edition and "0010" for the bargaining conditions. Here, the software management information 1240 and the license management information 1230 of FIG. 18 can be integrated into one table.

FIG. 22 schematically shows one example of the detail of the purchase management information 1260 for managing the progressing statuss of the software and the license being purchased. The example shown in FIG. 22 has a table structure. The purchase management information 1260 includes an order number 1261 of the order, a software identifier 1262 of the software to be purchased, sales company information 1263 of the software, purchase number information 1264, a purchase sum 1265, order date information 1266, shipping scheduled date information 1267 of the software purchased, and payment branch information 1268 such as a branch or project to pay the purchase sum.

Next, the procedure of the remote boot between each terminal unit and the common storage system 100 will be described by way of the terminal unit A 200A with reference to FIGS. 10, 11 and 12.

Figure 10:
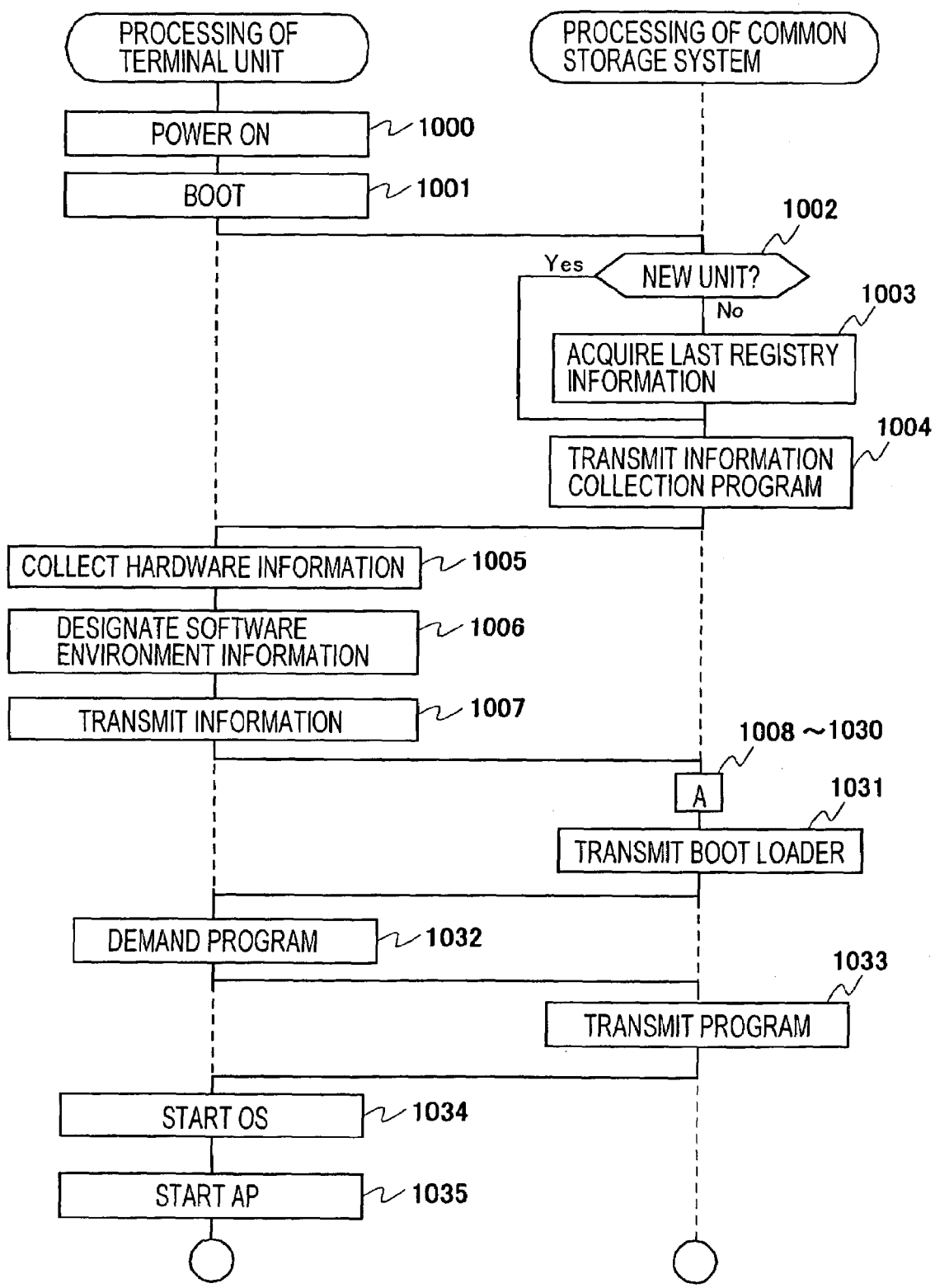
FIG. 10 is a flowchart showing a remote boot processing procedure (1/3)

As shown in FIG. 10, first, when the power of the terminal unit A 200A is turned ON (at Step 1000), the boot control circuit 205 is started. This boot control circuit 205 demands the common storage system 100 for the remote boot (at Step 1001) by adding the MAC address or the terminal unit identifying information. This demand is done through the network of the LAN 300 by using the network device 203.

The demand for the remote boot is so accepted and followed by the subsequent operations that the control device 110 in the common storage system 100 executes its one function or remote booting processing 1120. The subsequent operations are done in the following manners. Here, the following description will be made on the programs such as the remote boot processing as the main action. However, the actual processing is done by the cooperations between the control device and the programs.

The remote boot processing 1120 retrieves whether or not the above MAC address received from the terminal unit A 200A demanding the remote boot exists in the terminal unit information 1140 (as referred to FIG. 4).

In case the MAC address is absent in the terminal unit information 1140, the remote boot processing 1120 judges that the terminal unit is new and uses the common storage system 100 newly. In case the MAC address is present in the terminal unit information 1140, the terminal unit is judged not new (at Step 1002), because of the presence of the terminal unit information 1140.

In case the MAC address is present in the terminal unit information 1140, that is, in case the terminal unit is not new, the remote boot processing 1120 acquires the last registry information 1641 (at Step 1003) stored in the individual area of the execution environment identifier, as corresponding to the MAC address, with reference to the map information 1170 (as referred to FIG. 8) and the individual area information (as referred to FIG. 9). And, the information collection program 1620 stored in the terminal storage unit 160 is transmitted with that registry information 1641, to the terminal unit A 200A demanding the remote boot (at Step 1004).

In case the MAC address is not present in the terminal unit information 1140, that is, in the case of a new terminal unit, on the contrary, the MAC address is not present in the map information 1170. Therefore, the remote boot processing 1120 cannot acquire the registry information so that the information collection program 1620 is transmitted with the flag of "no registry information" to the terminal unit A 200A (at Step 1004).

The terminal unit A 200A receives the information collection program 1620. From now on, the CPU 201 of the terminal unit A 200A executes the information collection program 1620 to collect the information necessary for the remote boot. Here, the description will be made on the programs as the main actions. However, needless to say, the various operations in the terminal unit are done by the cooperation between CPU201 and the information collection program 1620.

The information collection program 1620 collects the hardware information 1143 of the terminal unit A 200A from the BIOS (at Step 1005). The hardware information 1143 is represented by the kind and number of the CPU 201 but includes the frequency of the CPU, the size of the memory 202 and so on. On the other hand, the program 1620 collects the user ID and the password inputted from the input device 204 by the user. Further, the program 1620 collects the software information (hereinafter referred to as "software demand") including the kinds of the operation system and the application program. According to these information collected, the information collection program 1620 updates the last registry information, if attached, and transmits it to the common storage system 100 (at Step 1007). In the absence of the last registry information, the program 1620 transmits these information collected to the common storage system 100 (at Step 1007).

Figure 13:
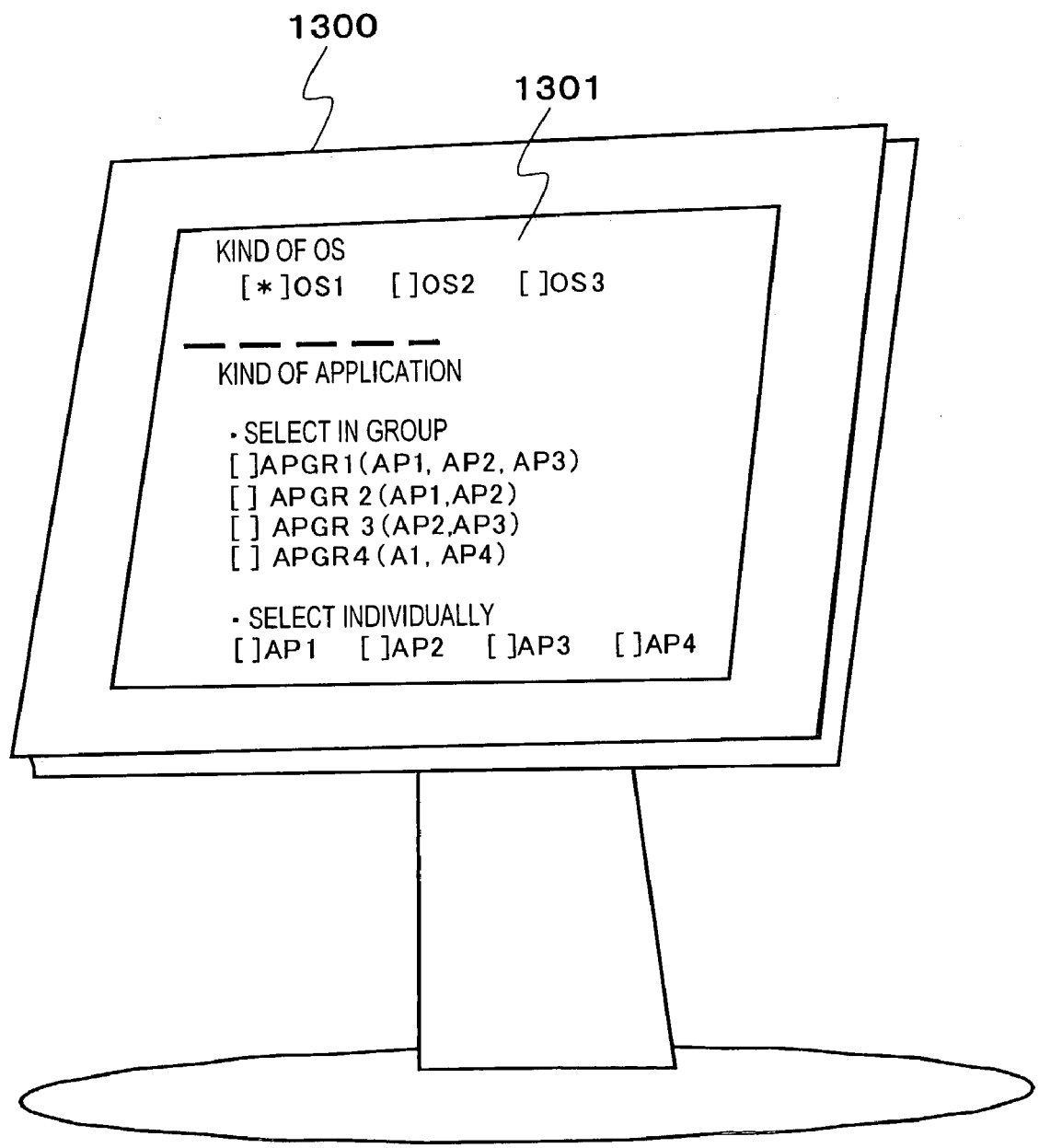
FIG. 13 is a screen image showing one example of an input screen of a software demand.

At the software demanding time, the information collection program 1620 makes a display, as shown in FIG. 13, in the display screen of the display device or the output device 206, and accepts an instruction of a necessary software from the input device 204. Specifically, at first, the name of an available OS is displayed in the upper portion of the display screen. In this state, the input to select one of the OSes displayed is accepted through the input device 204. Next, the kind of the application program to execute on that OS is displayed in the lower portion of the display device. The selection instruction of the kind of the application program displayed is accepted through the input device 204. As the method for selecting the application program, there are a method for designating a group unit, in which several application programs are combined, a method for selecting the necessary application programs individually, and so on.

Here, the software demand should not be limited to the embodiment shown in FIG. 13, but may contain another method such as a method for designating the OS and the application program in a set with the entire software.

The screen data displayed in the output device 206 of the terminal unit A 200A are transmitted as one function of the information collection program 1620 together with the information collection program 1620 to the terminal unit A 200A (at Step 1004).

Figure 11:
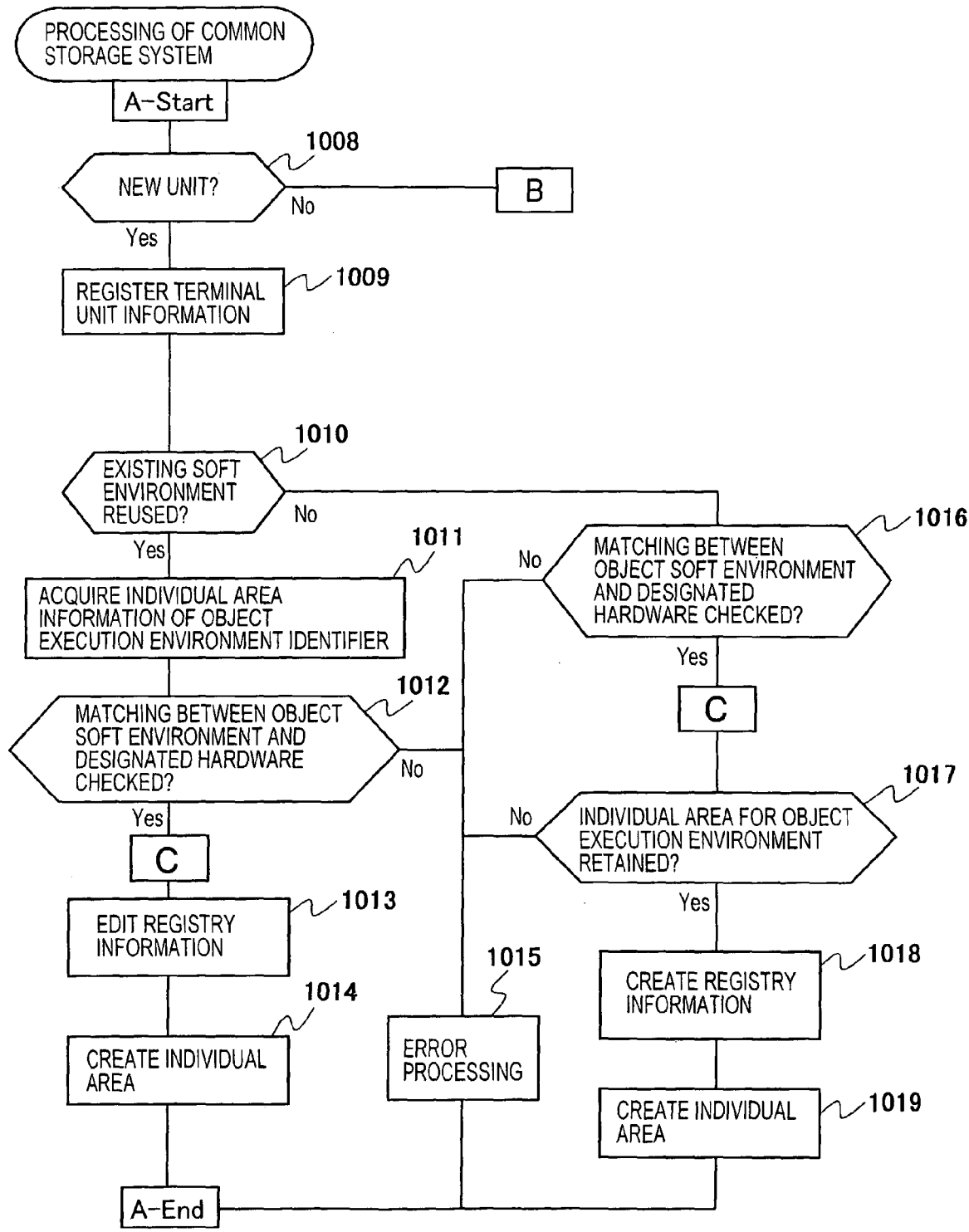
FIG. 11 is a flowchart showing the remote boot processing procedure (2/3)

Next, in the common storage system 100, the boot information processing (program) 1130 or one function of the control device 110 accepts the registry information transmitted from the terminal unit A 200A, and the information collected, as shown in FIG. 11.

The boot information processing (program) 1130 judges (at Step 1008) whether or not the terminal unit A 200A is new. If the terminal unit A 200A is new, the terminal information of the terminal unit A 200A is additionally registered in the terminal unit information 1140 (at Step 1009). At this time, the hardware information collected by the information collection program 1620 and the hardware information 1143 (as referred to FIG. 4) already registered in the terminal unit information 1140 are collated to retrieve whether or not the terminal unit of the same configuration exists in the terminal unit information 1140 (as referred to FIG. 4).

In case the same hardware information 1143 as that of the terminal unit A 200A is already registered in the terminal unit information 1140, the MAC address 1141 of the hardware information 1143 registered is detected, and the registry information 1641 (as referred to FIG. 17) of the execution environment identifier corresponding to the MAC address is detected with reference to the map information (as referred to FIG. 8). Next, the hardware information table 1643 (as referred to FIG. 14) of the registry information 1641 is copied to create the hardware information table 1643 of the registry information 1641 of the terminal unit A 200A.

In case the same hardware information 1143 as that of the terminal unit A 200A is not registered in the terminal unit information 25 1140, the hardware information table 1643 of the registry information 1641 is newly created on the basis of the hardware information collected by the information collection program 1620.

Next, the boot information processing 1130 judges (at Step 1010) whether or not the software environment of the existing execution environment can be reused, from the software demand designated from the terminal unit A 200A. In case the OS and the application program designated by the software demand are the same as those of the OS 1646 and the application program group 1647 of the already existing execution environment, it is judged that the existing execution environment can be reused. In the reusable case, the individual area information 1180 (as referred to FIG. 9) is referred to acquire the information of the individual area 1640 of the object execution environment identifier, that is, the leading address 1182 stored in the individual area and the size 1183 of the individual area (at Step 1011).

Next, it is confirmed with reference to the software information 1160 (as referred to FIG. 7) whether or not the object OS and the application program have the condition 1165 as to the execution environment OS and the application program. In the presence of the condition 1165, the matching is checked (at Step 1012) between the software and the hardware on whether or not the hardware of the terminal unit A 200A satisfies the condition 1165.

In case the software and the hardware mismatch, the boot information processing 1130 transmits an error message to the terminal unit A 200A (at Step 1015) to end the remote boot. The terminal unit A 200A outputs the error message to the output device 206. In case the mismatch occurs not at the OS but at the application program, however, a message that the mismatch application program cannot be used is transmitted to the terminal unit A 200A, and the remote boot operations are progressed (at Steps 1013 and 1014) but for that application program.

In a counter-measure for the mismatch, the boot processing may be continued by replacing the software by another such as a version-up edition, a version-down edition or a similar application. Specifically, the boot information processing 1130 transmits the error message of the mismatch to the terminal unit A 200A. In case another software can be used by the replacement, the instruction of the user to execute the replacement of the software or not is accepted. In case the instruction to execute the replacement is accepted, the software is replaced by the continuation of the remote boot processing. In this case of replacement by another software, moreover, the boot information processing 1130 turns ON the replacement flag held by the license processing 1270. Here, the initial value of the replacement flag is OFF.

In case the instruction of no replacement is accepted, the boot information processing 1130 judges whether the mismatching software is the OS or the application program, and ends the routine, because the booting operation cannot be done if the mismatching software is the OS. If this software is the application, the terminal unit A 200A is confirmed to continue the booting or not. The booting is continued, if instructed so, but ended if not.

Figure 24:
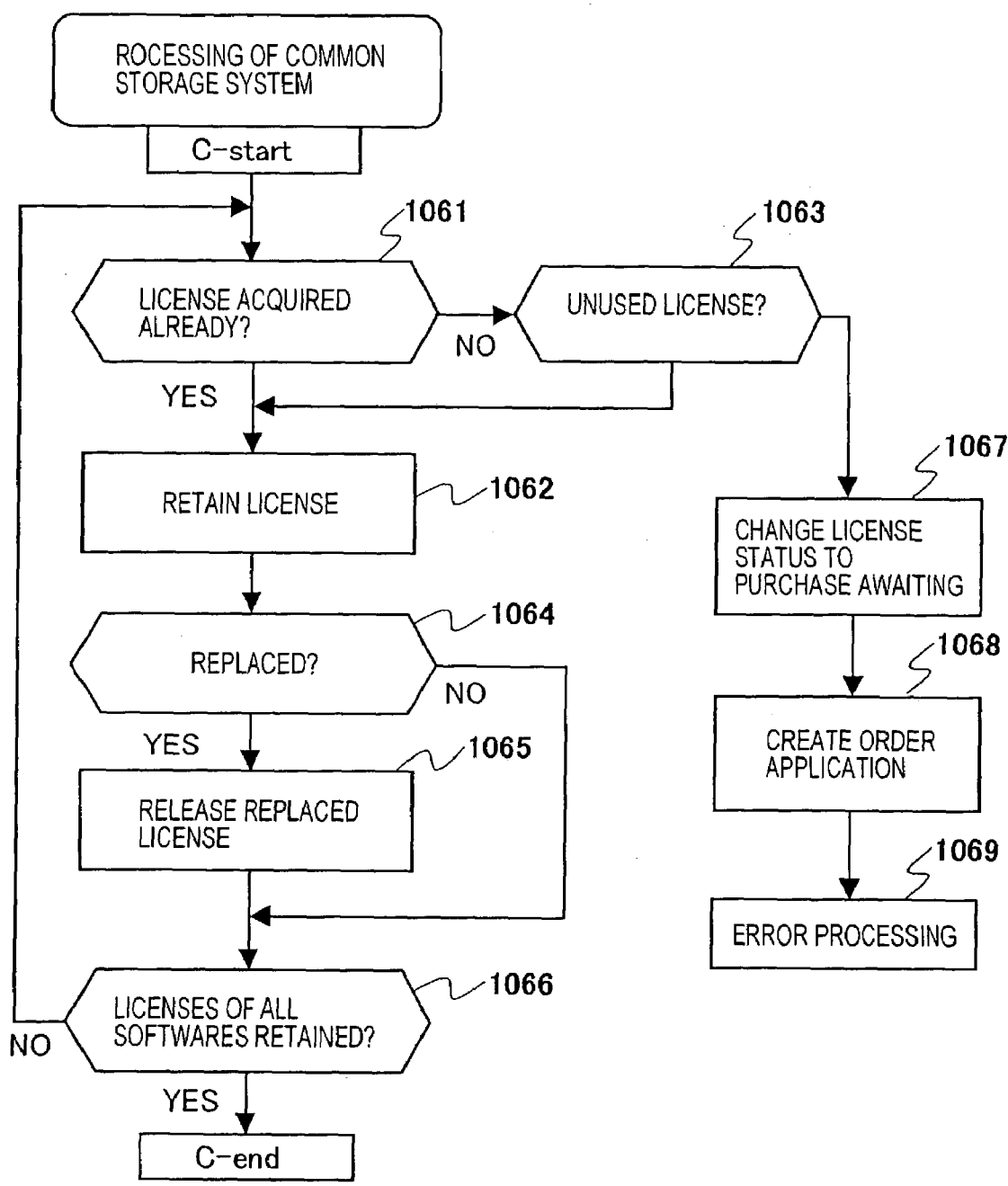
FIG. 24 is a flowchart showing a license processing procedure according to the first embodiment of the invention.

In case the software and the hardware are caused to match by the operations above, it is then judged with reference to FIG. 24 whether or not it is proper to use the license of the software.

First of all, the license processing 1270 judges with reference to the license distribution status information 1250 (as referred to FIG. 19) whether or not the object user has acquired the license key, to which the terminal unit is not assigned yet (at Step 1061). Specifically, it is judged whether the object user ID is stored in the user ID 1253 and whether or not the MAC address 1254 has the license key "NULL". In case the license key is acquired, the license processing 1270 registers the MAC address of the terminal unit A 200A in the column of the corresponding MAC address 1254, and changes the use status 1215 of the license use status information 1210 (as referred to FIG. 20) to the "0000" for the contracted and in-use status, thereby to retain the license (at Step 1062). Here in case the license use status information 1210 is not created, it is newly created.

In case the object user does not acquire the license key which is not assigned to the terminal unit, on the contrary, the license processing 1270 refers to the license distribution status information 1250 (as referred to FIG. 19), and confirms whether or not any license key is unused. This unused is judged depending on whether or not there is a license key having the "NULL" state of the user ID 1253 and the MAC address 1254. And, the unused license key is retained, if any, and the object user ID and the MAC address are registered in the user ID 1253 and the MAC address 1254. Moreover, the license is retained (at Step 1062) by counting up the use number 1234 of the license information 1230 (as referred to FIG. 18) and by changing the use status 1215 of the license use status information 1210 (as referred to FIG. 20) to the "0000" for the contracted and in-use status.

After having retained the license, the license processing 1270 judges (at Step 1064) whether or not the software has been replaced for retaining the matching of the hardware, from the replacement flag mentioned above. In the case of the replaced software (or in case the replacement flag is "ON"), the license of the software demanded before is not used so that the license processing 1270 releases the license of the software demanded before (at Step 1065). Specifically, the license processing 1270 releases the license (at Step 1065) by changing the object user ID of the license distribution status information 1250 (as referred to FIG. 19) to NULL, by counting down the use number 1234 of the license information (as referred to FIG. 18) and by changing the use status 1215 of the license use status information 1210 (as referred to FIG. 20) to the "0001" for the contracted but unused status. And, the license processing 1270 returns the replacement flag to OFF.

The license processing 1270 judges (at Step 1066) whether or not the licenses are retained for all the software demanded for the remote boot. The routine returns to Step 1061 so that it is continued, in case there is software having a not-retained license.

Here will be described the processing of the case of no unused license (at step 1063). In case of no unused license or in case there is not a result that the demanded software has been purchased, by the license processing 1270, the purchase status 1237 of the license information 1230 (as referred to FIG. 18) is updated to the "awaiting a purchase decision", and the use status of the license use status information 1210 (as referred to FIG. 20) is updated to the "waiting the purchase decision" (at Step 1067). Next, the license processing 1270 acquires the information necessary for purchasing the software from the software management information 1240 (as referred to FIG. 21), and an order application for purchasing the software is created (at Step 1068) and sent to the license manager. And, the license processing 1270 transmits the error message to the terminal unit A 200A and ends the remote boot (at Steps 1015 and 1069). The terminal unit A 200A outputs the error message to the output device 206. Here in this case, the license processing 1270 may inquire the terminal unit A 200A whether or not the remote boot processing is to be continued, and may decide whether the remote boot is continued or quit, according to the inquiry result.

By the operations described above, he use of the license of the software is judged whether or not it is proper.

In case the software and the hardware match and in case the license of the software can be retained, the registry information 1641 is edited (at Step 1013).

The hardware information table 1643 matching the registry information 1641 of the execution environment to be reused is rewritten to the contents of the terminal unit information of the terminal unit A 200A.

The software information table 1644 (as referred to FIG. 14) is used in the existing structure so that the present execution environment may be reused.

The contents of the user information table 1645 (as referred to FIG. 14) are used as they are, in case the user ID and the password inputted from the terminal unit A 200A exist in the existing user information table 1645. In case the user ID and the password do not exist in the existing user information table 1645, the user information is newly and additionally created with the user ID and the password inputted in the user information table 1645 with reference to the user information 1150.

As described above, the boot information processing 1130 edits the registry information 1641 (at Step 1013).

After the edition of the registry information 1641 was completed, the individual area 1640 of the present execution environment 1640 is created (at Step 1014). In this case, the existing execution environment is reused so that the OS 1646 and the application program group 1647 in the existing individual area 1640 can be reused as they are. In this case, it is implied that the terminal unit A 200A is a new terminal unit and acts in any existing execution environment.

Here in the method of this embodiment, the registry information 1641 of the execution environment to be reused is rewritten for the terminal unit using it and for the user each time of the remote boot, so as to avoid the multiple managements of the execution environment. However, the method should not be limited to the aforementioned one. For example, there may be adopted a method, by which the individual area 1640 is newly retained while the execution environment of the reuse source being left. In the case of this method, the registry information may be copied from that of the reuse source, and the information of the changed portion may be updated for use. Alternatively, the registry information may be newly created.

Next, in case the answer to the judgment (at Step 1010) on whether or not the software environment of the existing execution environment can be reused is No, that is, in case the software-demanded OS and application are not in the existing execution environment, it is judged that the reuse is impossible. Next, it is checked (at Step 1016) whether or not the software-demanded OS and application and the hardware of the terminal unit A 200A can match. The processing of this step is similar to that of Step 1012. Moreover, the error processing (of Step 1015) in the failure of the matching has also been described. Next, it is judged (as referred to FIG. 24) whether or not the use of the license of the software is proper. This processing has also been described.

In case the matching is taken and in case the license of the software can be retained, a new execution environment has to be created so that the new individual area 1640 is retained in the terminal storage unit 160 (at Step 1017). In case the new individual area 1640 cannot be retained due to shortage of the capacity of the terminal storage unit 160, the error message is transmitted to the terminal unit A 200A to end the remote boot (at Step 1015). In case the new individual area can be retained, the registry information 1641 is newly created (at Step 1018).

Here, the hardware information table 1643 in the registry information 1641 is created on the basis of the contents of the terminal unit information of the terminal unit A 200A. At this time, in case the same hardware information 1143 as that of the terminal unit A 200A is already registered in the terminal unit information 1140, the hardware information table 1643 of the registry information 1641 corresponding to the registered hardware information 1143 can be copied to create the hardware information table 1643 of the terminal unit A 200A, as has been described hereinbefore.

The software information table 1644 is created as to the software-demanded OS and application designated by the terminal unit A 200A, with reference to the software information 1160.

The contents of the user information table 1645 are used as they are, in case the user ID and the password inputted from the terminal unit A 200A are identical to those existing in the existing user information table 1645. In the absence from the existing user information table 1645, the user information is newly added and created with the user ID and the password inputted, in the user information table 1645 with reference to the user information 1150.

Thus, the boot information processing edits the registry information (at Step 1018).

After the edition of the registry information 1641 was completed, the individual area 1640 of the present execution environment is created (at Step 1019) on the basis of the registry information 1641. Specifically, the OS 1646 and the application program group 1647, as recorded in the software information table 1644, are loaded from the common area 1630 of the terminal storage unit 160. In this case the terminal unit A 200A indicates that it is a new terminal unit and that it acts in the new execution environment.

Figure 12:
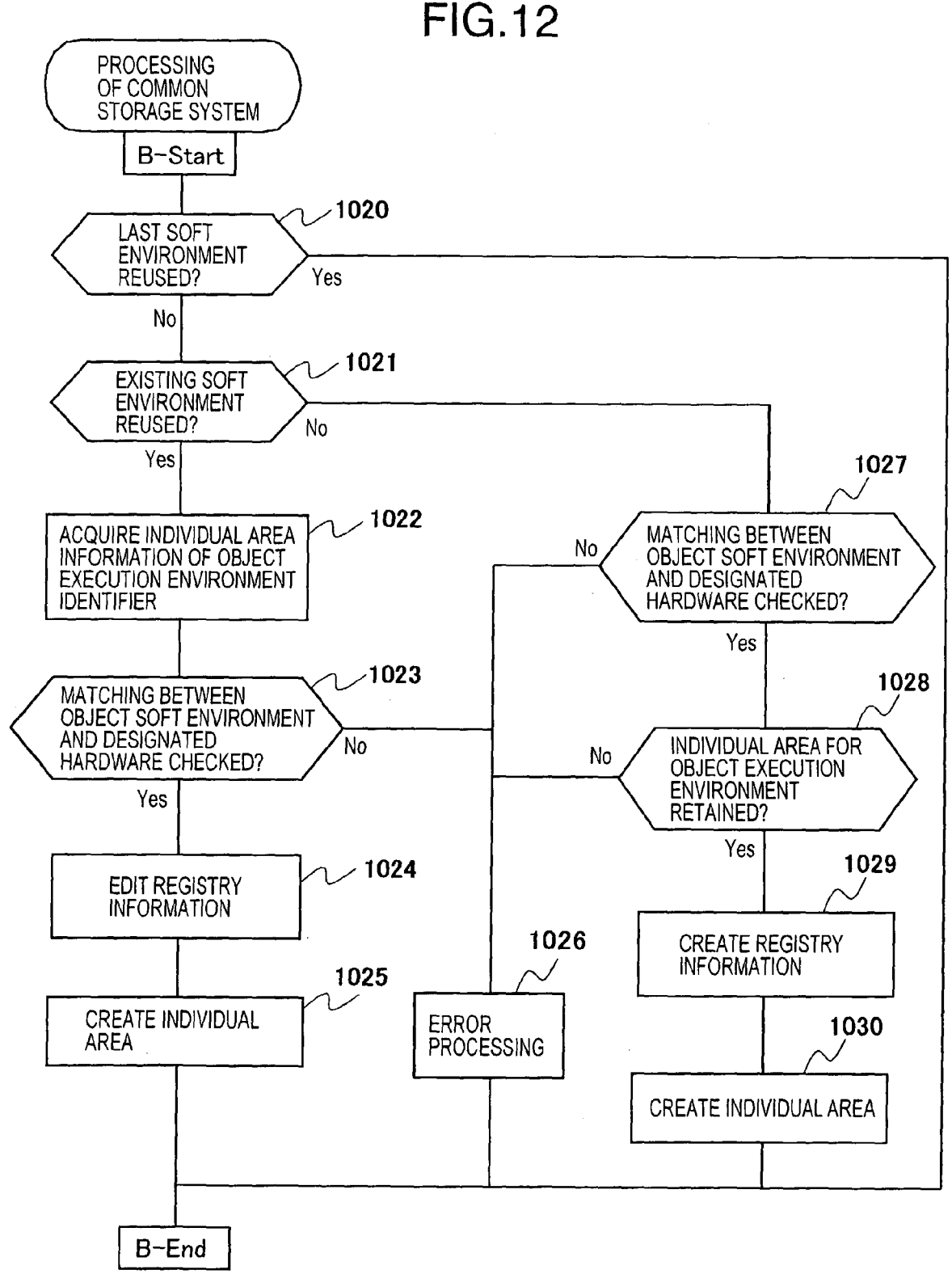
FIG. 12 is a flowchart showing the remote boot processing procedure (3/3)

FIG. 12 shows flows of the case, in case the MAC address of the terminal unit A 200A is already present in the terminal unit information 1140, that is, in case the terminal unit A 200A is not a newly connected new terminal unit.

The boot information processing 1130 judges whether or not the software environment of the last used execution environment can be reused, from the software demand designated from the terminal unit A 200A (at Step 1020). In case the OS and application program designated by the software demand are identical to the OS 1646 and the application program group 1647 of the last execution environment, it is judged that the last execution environment can be reused. In case the software environment of the last used execution environment cannot be reused, the boot information processing then judges (at Step 1021) whether or not the software environment of the already existing execution environment can be reused.

In case the software environment of the existing execution environment can be reused, the subsequent operations (of Steps 1022 to 1026) are identical to those of the aforementioned Steps 1011 to 1015. In this case, it is indicated that the terminal unit A 200A is an existing terminal unit and acts in any of the existing execution environments.

In case the software environment of the existing execution environment cannot be reused, on the contrary, the subsequent operations (of Steps 1027 to 1030) are identical to those of Steps 1016 to 1019. In this case, it is indicated that the terminal unit A 200A is an existing terminal unit and acts in a new execution environment.

In case the answer of the judgment (of Step 1020) on whether or not the software environment of the last used execution environment can be reused is Yes, on the contrary, the registry information 1641 of the last used execution environment and the individual area 1640 are used as they are, to advance the remote boot processing. In this case, it is indicated that the terminal unit A 200A is an existing terminal unit and can act in the last execution environment.

Next, in case the individual area 1640 can be normally formed, the remote boot processing 1120 transmits the program necessary for the boot processing to the terminal unit A 200A, as shown in FIG. 10. Here, the program necessary for the boot processing can be typically exemplified by the boot loader program 1610, the OS 1646 and the application program group 1647. In another method, however, it is conceivable that a portion (e.g., the boot loader program 1610) of the program necessary for the boot processing is held in advance by the terminal unit but is not transmitted to the terminal unit A 200A. In this embodiment, the boot loader program 1610, the OS 1646 and the application program group 1647 are transmitted as the program necessary for the boot processing to the terminal unit A 200A, as will be described in the following.

The remote boot processing 1120 transmits the boot loader program 1610 to the terminal unit A 200A (at Step 1031). This terminal unit A 200A executes the boot loader program 1610 transmitted from the common storage system 100. And, the common storage system 100 is demanded (at Step 1032) for transmitting the individual area 1640 which is stored with the OS 1646, the application program group 1647 and so on of the execution environment identifier to function as the auxiliary storage unit of the terminal unit A 200A.

The remote boot processing 1120 of the common storage system 100 receives that demand and transmits the object individual area (at Step 1033). The demander terminal unit A 200A starts the OS 1646 contained in the transmitted individual area (at Step 1034), and then starts the application program group 1647 to act on the OS (at Step 1035).

Thus, the remote boot processing of the terminal unit A 200A is completed. As a result, in response to the demand for the remote boot from the terminal unit, the hardware information and the software information necessary for the remote boot can be automatically collected without raising no work of the system manager, so that the registry information can be automatically created in the common storage system thereby to realize the remote boot.

Here in this embodiment, the information collection program 1620 and the boot loader program 1610 are made different, but the information collection program 1620 may be assembled as a portion of the function of the boot loader program 1610 to provide the information collection function and the boot loader function in one program.

On demand for the remote boot, moreover, it is conceivable to judge in advance whether or not the user having demanded can purchase the license of the software, from the user ID, the belonging branch, the business post and so on of the user, thereby to judge whether or not the subsequent operations are to be continued. By holding the user ID and the corresponding table indicating the purchasing authority in the control device 110, for example, the error processing can be done against the user having no purchasing authority, to quit the remote boot processing. Moreover, this purchasing authority can be so arbitrarily determined as to purchase the license of a specific software but not the license of another software. In case the user ID has the purchasing authority but is not registered in the user information 1150, moreover, its user information is newly registered in the user information.

Figure 25A:
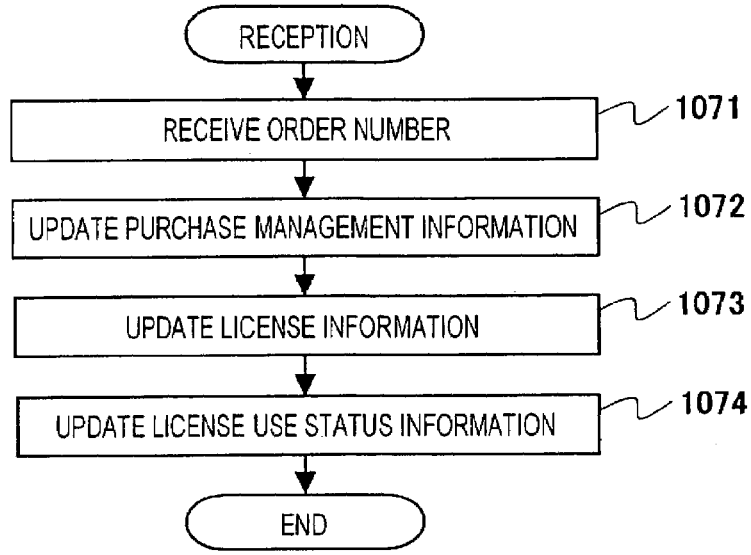
FIGS. 25A and 25B are flowcharts showing license service processing procedures according to the first embodiment of the invention.
Figure 25B:
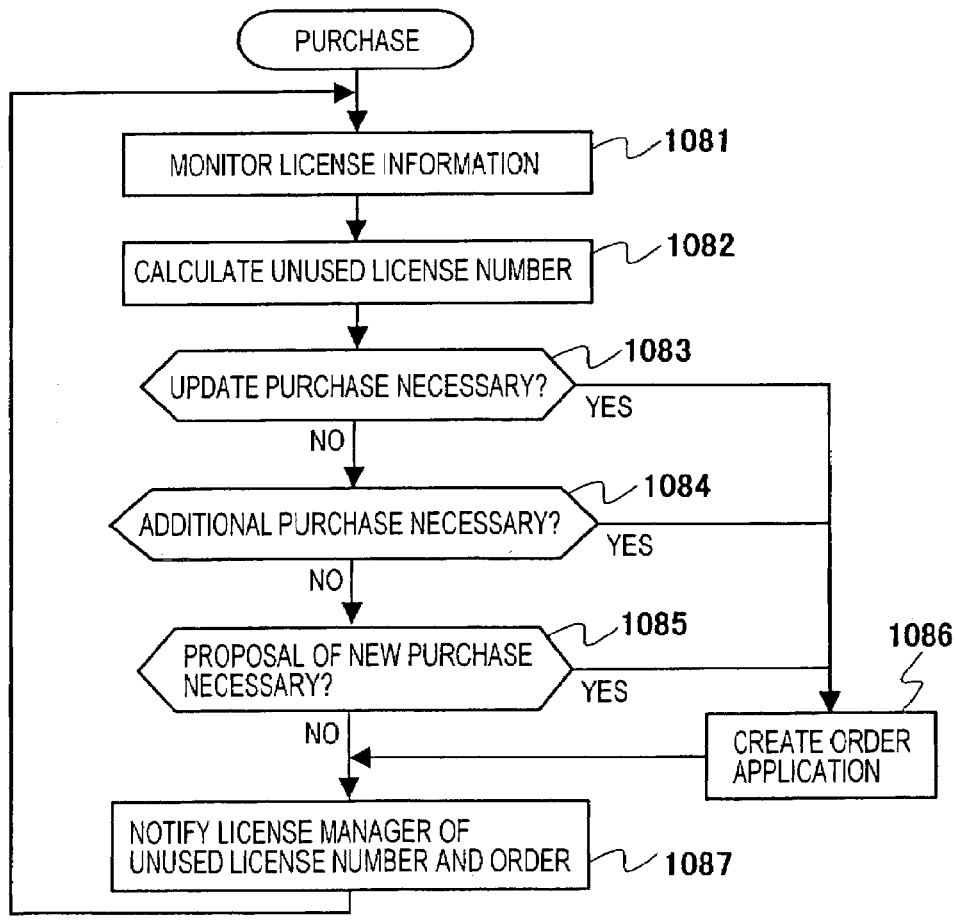

Here will be described the license service processing 1280. FIGS. 25A and 25B show flows of the license service processing. This license service processing 1280 is done by the license manager for managing the licenses and has a receiving routine and a purchasing routine.

First of all, the receiving routine will be described with reference to FIG. 25A. The license manager starts, when the ordered software is received, the receiving routine contained in the license service processing 1280, from the terminal unit, and inputs the order number of the software delivered. The license service processing 1280 receives the order number inputted (at Step 1071), and then deletes the information of the corresponding order number (at Step 1072) from the purchase management information 1260 (as referred to FIG. 22). And, the delivered license is added to the license information 1230 (as referred to FIG. 18) (at Step 1073), and the use status flag 1215 of the license use status information 1210 (as referred to FIG. 20) is changed to "purchased and awaiting an installation" (at Step 1074). Here at the next remote boot processing time, the license processing 1270 can inquire whether or not the software delivered to the user is to be installed, with reference to the use status flag 1215, and can do the installation, if necessary, by installing that software additionally or by replacing the same by another software. In another method, while the user demanding the use is booting, the license processing 1270 may inquire the terminal unit whether or not the installation should be immediately done, and may do it immediately if demanded.

Here will be described the purchasing routine with reference to FIG. 25B. The license service processing 1280 monitors (or acquires) the license information 1230 (as referred to FIG. 18) at every predetermined time intervals (at Step 1081). With reference to the contract number 1233 and the use number 1234 of the licenses, moreover, the license service processing 1280 calculates the number of unused licenses, the increase/decrease in the number of unused licenses from that of the last monitoring (at Step 1082). Here, the monitored information is held for a predetermined period so that the history of the past monitoring information can be referred to.

Next, the license service processing 1280 compares the validity term 1236 of the license of the license information 1230 and the date of this day or a designated date and judges it necessary to update the license (at Step 1083), in case the day number within the validity term is less than a predetermined value, i.e., a threshold value. Next, the license service processing 1280 predicts the date, on which the number of unused licenses is zero, from the history of the monitoring information till then, and judges (at Step 1084) it necessary to purchase the license additionally in case the day number to that date is less than a predetermined value, i.e., a threshold value. Next, the license service processing 1280 refers to the software management information 1240 (as referred to FIG. 21). And, the license software processing 1280 compares the sales date of the software not purchased yet, such as a software of new issue or the version-up edition of the purchased software with this date or a designated date. If the day number till the sales date is less than a predetermined value, i.e., a threshold value, the license software processing 1280 judges it necessary to propose the purchase of the new software (at Step 1085).

In case it is necessary to propose the update purchase, the additional purchase or the new purchase, the license service processing 1280 calculates the purchase specifications such as the numbers of object softwares and licenses and the estimated sum with reference to the software management information 1240, and creates an order application (at Step 1086). And, the license service processing 1280 transmits the order application together with the information (at Step 1082) on the calculated number of unused licenses to the license manager (at Step 1087). In case the proposals of the update purchase, the additional purchase and the new purchase are unnecessary, on the other hand, only the information of the number of unused licenses is transmitted to the license manager (at Step 1087).

Here in this embodiment, the purchasing routine is started (or monitored) at every predetermined time intervals. In another conceivable method, however, the license manager may start the purchasing routine at any time.

By this license service processing, it is possible to supply the licenses properly before their stock disappears and to plan the license purchase when its money is prepared. This function can reduce troubles, as might otherwise be involved in the purchase of licenses, and there is provided an environment capable of realizing the use of the software as soon as the use of the software is demanded.

Here will be described the routine of the ordering program 563 in the ordering system 500. This ordering program 563 is to accept the purchase information of the software and the license from the license processing 1270 and to order the software to the sales company.

With reference to the order application created in the license processing 1270 and the license service processing 1280, the license manager judges whether or not the software and the license are to be purchased. On the software and the software approved to be purchased by the license manager, the data are added to the purchase management information 1260 (as referred to FIG. 22), and the purchase management information 1260 is transmitted to the ordering system 500.

The network processing 562 of the ordering system 500 accepts the purchase management information added from the license processing 1270, through the network device A 530, and transfers the information to the ordering program 563. And, this ordering program 563 creates the ordering application for and according to the object software sales company, and the network processing 562 orders by transmitting the ordering application to the software sales company through the network device B 531.

The first embodiment has been described hereinbefore.

Here will be described a second embodiment. This embodiments presents the mode, in which one user uses a plurality of execution environments.

Figure 15:
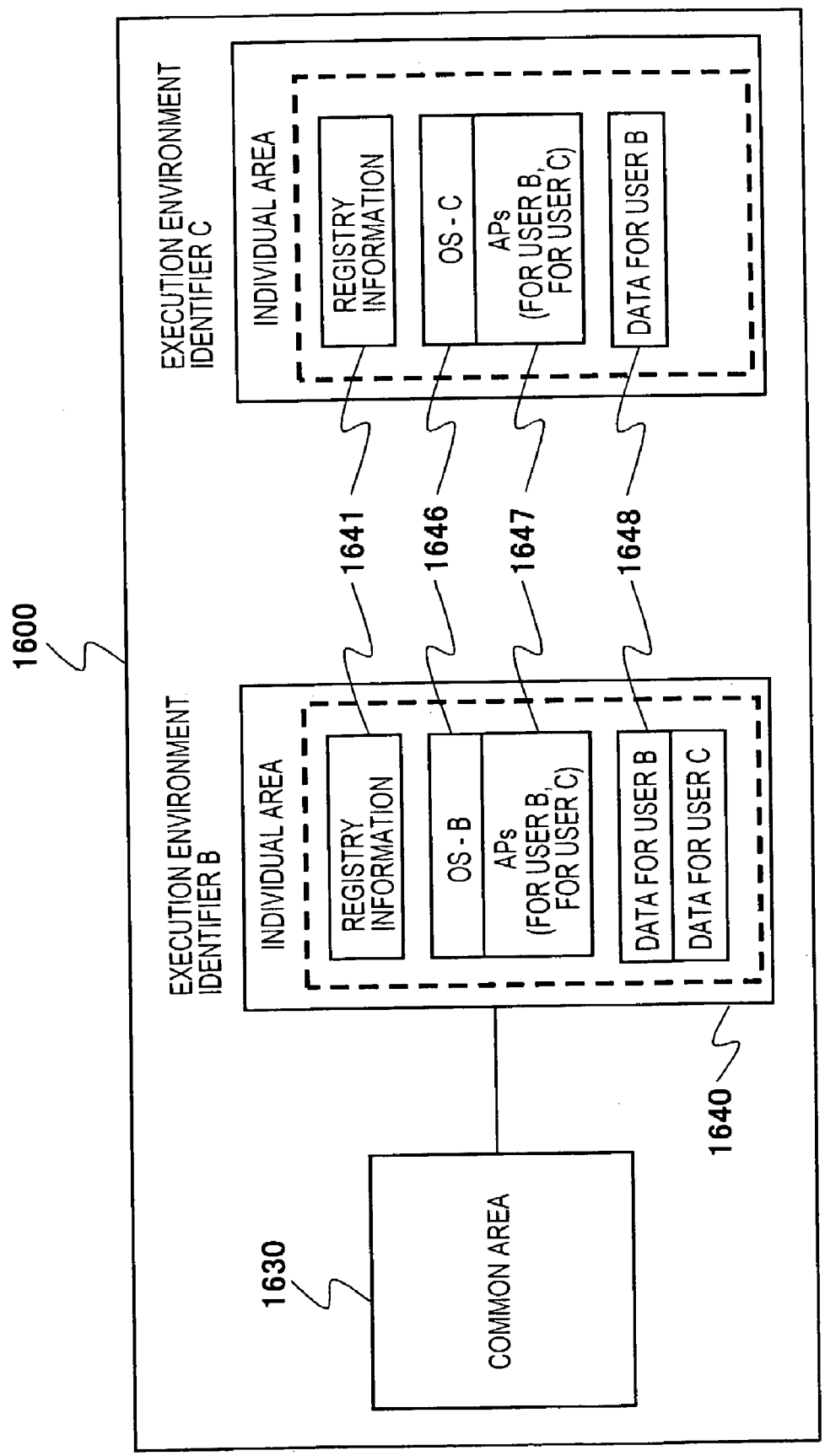
FIG. 15 is a block diagram showing a configuration of an individual area to be managed by using an execution environment identifier, according to a second embodiment of the invention.

FIG. 15 shows that a user B has two different execution environments, i.e., the execution environment (or execution environment identifier B) in which the OS 1646 is OS-B, and the execution environment (or execution environment identifier C) in which the OS 1646 is OS-C. Here in case the user B has a plurality of execution environment identifiers, the user B has the execution environment identifiers even if the application program groups 1647 to be used are different even for the different OSes or the identical OS 1646.

In the execution environment identifier B, on the other hand, there is shown the individual area 1640 of the case, in which a plurality of users use the execution environment of the same OS and application program. In the individual area 1640, the user B and the user C use the same OS and application program. Therefore, the OS 1646 and the application program 1647 are shared. On the other hand, the individual user data 1648 are separately stored. In this case, two user information tables 1645 of the registry information 1641 are created for the user B and the user C.

FIG. 16 shows one example of the data structure of the user information 1150 schematically. The example of FIG. 16 has a table structure. FIG. 16 shows that the user B has two execution environments of the execution environment identifiers B and C. It is also shown that the user C shares the execution environment identifier B with the user B.

As a result, this embodiment is different from the first embodiment in that at least the user has a plurality of execution environment identifiers, and in that a plurality of user data are stored in one execution environment identifier. This second embodiment can also expect effects similar to those of the first embodiment. Moreover, the second embodiment has an effect that a user can work in a plurality of execution environments of different OSes and application programs.

According to the individual embodiments of the invention, as has been described hereinbefore, when the execution environment of a terminal unit is created in another terminal unit, information necessary for a remote boot processing can be collected in response to a demand for a remote boot. By creating registry information automatically, moreover, the remote boot can be easily realized to match the configuration change in the system easily. Moreover, the terminal unit used by the user is not fixed, so that the registry information need not be prepared in the case of a system configuration change for introducing a new terminal unit, in case a different terminal unit is used at each time. There is obtained an effect that the working load on a system administrator can be lightened.

According to the invention, in case the execution environment of a terminal unit is created in another terminal unit, the registry information can be automatically created in response to a demand for the remote boot thereby to realize the remote boot easily.

What is claimed is:

1. A common storage system shared by one or more computers connected through a network, comprising:
    when a demand for a boot is received from the one or more computers, means for sending a program for collecting hardware information containing a kind and number of a central processing unit (CPU) of the one or more computers demanding the boot and software information containing kinds of an operation system and an application program, to the one or more computers demanding the boot;
    when the hardware information and the software information are received from the one or more computers demanding the boot, means for creating registry information by using the hardware information and the software information; and
    means for sending a program necessary for processing the boot to the one or more computers demanding the boot according to the registry information.

2. A common storage system according to claim 1, further comprising:
    means for judging matching between the hardware information and the software information of the one or more computers demanding the boot.

3. A common storage system according to claim 1,
    wherein the common storage system includes a storage unit for functioning as an auxiliary storage unit of the one or more computers demanding the boot,
    further comprising:
    means for judging whether or not an execution environment suitable for the software information is already present in the storage unit;
    means for editing registry information by using the registry information of the suitable execution environment, if any; and
    means for newly creating registry information when the suitable execution environment is absent.

4. A common storage system according to claim 1,
wherein the program for collecting the hardware information and the software information includes means for displaying a screen for inputting the software information, on the one or more computers demanding the boot.

5. An information processing system comprising one or more computers, and a common storage system shared by the one or more computers connected through a network,
wherein the common storage system is a common storage system according to claim 1, and
wherein the one or more computers comprise:
means for sending a boot demand to the common storage system;
means for receiving a program to collect the hardware information and the software information of the one or more computers, from the common storage system and for collecting and sending the hardware information and the software information to the storage system; and
means for receiving a program necessary for processing the boot from the common storage system so as to boot the storage system.

6. A common storage system according to claim 1, further comprising:
means for storing license information of a software to be used at least in the one or more computers and use status information of the license for each program necessary for processing the boot; and
means for managing the license information in association with the operation of the program necessary for processing the boot.

7. A common storage system according to claim 1, further comprising:
means for storing at least license information of a software to be used in the one or more computers and use status information of the license for each program necessary for processing the boot;
means for managing the license information in association with the operation of the program necessary for processing the boot;
means for newly retaining a license when the registry information is created;
means for moving the license dynamically to another computer;
means for judging it unnecessary to have multiplex licenses by a replacement such as an update; and
means for returning the license when it is judged that the multiplex licenses are unnecessary.

8. A common storage system according to claim 1, further comprising:
means for storing at least license information of a software to be used in the one or more computers and use status information of the license for each program necessary for processing the boot;
means for managing the license information in association with the operation of the program necessary for processing the boot;
means for monitoring the license information; and
means for notifying a license manager of a result of monitoring.

9. A common storage system according to claim 1, further comprising:
means for storing at least license information of a software to be used in the one or more computers and using status information of the license for each program necessary for processing the boot;
means for managing the license information in association with the operation of the program necessary for processing the boot;
means for monitoring the license information;
means for notifying a license manager of a result of monitoring; and
means for analyzing the result of monitoring and notifying the license manager of an estimation of excess or deficiency of the license and a purchase specification of license by comparison with the validity term of the license.

10. A common storage system according to claim 1, further comprising:
means for storing at least license information of a software to be used in the one or more computers, use status information of the license for each program necessary for processing the boot, and software management information for managing the software;
means for managing the license information in association with the operation of the program necessary for processing the boot;
means for monitoring the software management information;
means for notifying a license manager of a result of monitoring;
means for acquiring sales information of the software through internet or intranet and for storing the acquired information in the software management information; and
means for notifying the license manager of information of at least repurchasing timing and number and estimated sum on the basis of the sales information of the acquired software.

11. A common storage system according to claim 1, further comprising:
means for storing at least license information of a software to be used in the one or more computers and use status information of the license for each program necessary for processing the boot;
means for managing the license information in association with the operation of the program necessary for processing the boot;
means for monitoring the license information;
means for notifying a license manager of a result of monitoring;
means for analyzing the result of monitoring and notifying the license manager of an estimation of excess or deficiency of the license and a purchase specification of license by comparison with the validity term of the license; and
means for ordering in association with an ordering system to perform ordering operations by creating an order application of the license on the basis of the purchase specification, by notifying the license manager and by accepting an order approval of the license manager.

12. A common storage system according to claim 1, further comprising:
means for storing at least license information of a software to be used in the one or more computers and use status information of the license for each program necessary for processing the boot;
means for managing the license information in association with the operation of the program necessary for processing the boot;
means for monitoring the license information;
means for notifying a license manager of a result of monitoring;

means for analyzing the result of monitoring and notifying the license manager of an estimation of excess or deficiency of the license and a purchase specification of license by comparison with the validity term of the license;

means for accepting an instruction of the license manager; and means for accepting the instruction, acquiring the result of monitoring and the purchase specification and notifying the license manager.

13. A computer connected to a storage system through a network, comprising:

means for sending a boot demand to the storage system;

means for receiving a program to collect hardware information containing a kind and number of a central processing unit (CPU) of the computer and software information containing kinds of an operation system and an application, from the storage system, and for collecting and sending the hardware information and the software information to said storage system; and means for receiving a program necessary for a boot processing from the storage system so as to boot the storage system.

14. A computer according to claim 13, wherein the program to collect hardware information and software information includes means for displaying a screen to input the software information, and wherein the computer includes means for inputting the software information to the screen.

15. A method to be executed in and by a second information processing device, wherein the second information processing device performs the steps of:

displaying a screen to input software information containing kinds of an operation system and an application program demanded by the second information processing device;

accepting the software information inputted from the second information processing device; and sending the accepted software information to a first information processing device.

16. A first information processing device comprising:

when a demand for a boot is received from a second information processing device, sending a program for collecting hardware information containing a kind and number of a central processing unit (CPU) of the second information processing device and software information containing kinds of an operation system and an application program, to the second information processing device demanding the boot;

when the hardware information and the software information are received from the second information processing device demanding the boot, means for creating registry information by using the hardware information and the software information; and means for sending a program necessary for the boot to the second information processing device demanding the boot, based on the registry information.

17. A method to be executed by a first information processing device for a boot of a second information processing device, wherein the first information processing device performs the steps of:

when a demand for the boot is received from the second information processing device, sending to the second processing device demanding the boot a program to collect hardware information containing a kind and number of a central processing unit (CPU) of the second information processing device and software information containing kinds of an operation system and an application program;

when the hardware information and the software information are received from the second information processing device demanding the boot, creating registry information by using the hardware information and the software information; and sending a program necessary for processing the boot to the second information processing device demanding the boot, based on the registry information.

18. A method for a boot of a computer connected to a network, comprising the steps of:

when a demand for the boot is received from the computer, sending to the computer demanding the boot, a program to collect hardware information containing a kind and number of a central processing unit (CPU) of the computer and software information containing kinds of an operation system and an application program;

when the hardware information and the software information are received from the computer demanding the boot, creating registry information by using the hardware information and the software information; and sending a program necessary for processing the boot to the computer demanding the boot, based on the registry information.

* * * * *